(12) United States Patent
Slayzak et al.

(10) Patent No.: US 7,306,650 B2
(45) Date of Patent: Dec. 11, 2007

(54) USING LIQUID DESICCANT AS A REGENERABLE FILTER FOR CAPTURING AND DEACTIVATING CONTAMINANTS

(75) Inventors: Steven J. Slayzak, Denver, CO (US); Ren S. Anderson, Broomfield, CO (US); Ronald D. Judkoff, Golden, CO (US); Daniel M. Blake, Golden, CO (US); Todd B. Vinzant, Golden, CO (US); Joseph P. Ryan, Golden, CO (US)

(73) Assignee: Midwest Research Institute, Kansas City, MO (US)

( * ) Notice: Subject to any disclaimer, the term of this patent is extended or adjusted under 35 U.S.C. 154(b) by 899 days.

(21) Appl. No.: 10/477,385

(22) PCT Filed: Feb. 28, 2003

(86) PCT No.: PCT/US03/06292

§ 371 (c)(1),
(2), (4) Date: Nov. 7, 2003

(87) PCT Pub. No.: WO2004/078322

PCT Pub. Date: Sep. 16, 2004

(65) Prior Publication Data

US 2004/0231512 A1 Nov. 25, 2004

(51) Int. Cl.
*B01D 53/14* (2006.01)
(52) U.S. Cl. .............................. 95/91; 95/231; 96/118; 96/120
(58) Field of Classification Search .................... 95/91, 95/211, 231; 96/118, 119, 120, 290
See application file for complete search history.

(56) References Cited

U.S. PATENT DOCUMENTS

| | | | | |
|---|---|---|---|---|
| 1,791,086 A | * | 2/1931 | Sperr, Jr. ...................... | 95/225 |
| 2,221,787 A | * | 11/1940 | Downs et al. ................. | 95/10 |
| 2,235,322 A | * | 3/1941 | Martin ......................... | 95/192 |
| 2,988,171 A | * | 6/1961 | Arnold et al. ................ | 95/193 |
| 4,259,849 A | * | 4/1981 | Griffiths ...................... | 62/271 |
| 4,941,324 A | * | 7/1990 | Peterson et al. ............... | 62/94 |

(Continued)

OTHER PUBLICATIONS

U.S. Joint Forces Chemical/Biological Defense Command for Collective Protection, Collective Protection Master Plan Summary, DOD Chemical & Biological Defense Program, AFRL/MLQ, Tyndall AFB, Florida, no date given.

*Primary Examiner*—Frank M. Lawrence
(74) *Attorney, Agent, or Firm*—Paul J. White

(57) ABSTRACT

A method, and systems for implementing such method, for purifying and conditioning air of weaponized contaminants. The method includes wetting a filter packing media with a salt-based liquid desiccant, such as water with a high concentration of lithium chloride. Air is passed through the wetted filter packing media and the contaminants in are captured with the liquid desiccant while the liquid desiccant dehumidifies the air. The captured contaminants are then deactivated in the liquid desiccant, which may include heating the liquid desiccant. The liquid desiccant is regenerated by applying heat to the liquid desiccant and then removing moisture. The method includes repeating the wetting with the regenerated liquid desiccant which provides a regenerable filtering process that captures and deactivates contaminants on an ongoing basis while also conditioning the air. The method may include filtration effectiveness enhancement by electrostatic or inertial means.

42 Claims, 9 Drawing Sheets

U.S. PATENT DOCUMENTS

| | | | |
|---|---|---|---|
| 4,979,965 A * | 12/1990 | Sannholm | 95/194 |
| 5,186,903 A | 2/1993 | Cornwell | |
| 5,221,520 A | 6/1993 | Cornwell | |
| 5,534,186 A * | 7/1996 | Walker et al. | 252/194 |
| 5,933,702 A | 8/1999 | Goswami | |
| 6,156,102 A * | 12/2000 | Conrad et al. | 95/172 |
| 6,216,483 B1 | 4/2001 | Potnis et al. | |
| 6,417,423 B1 | 7/2002 | Koper et al. | |
| 6,488,900 B1 | 12/2002 | Call et al. | |
| 6,514,321 B1 * | 2/2003 | Lehto et al. | 95/180 |

\* cited by examiner

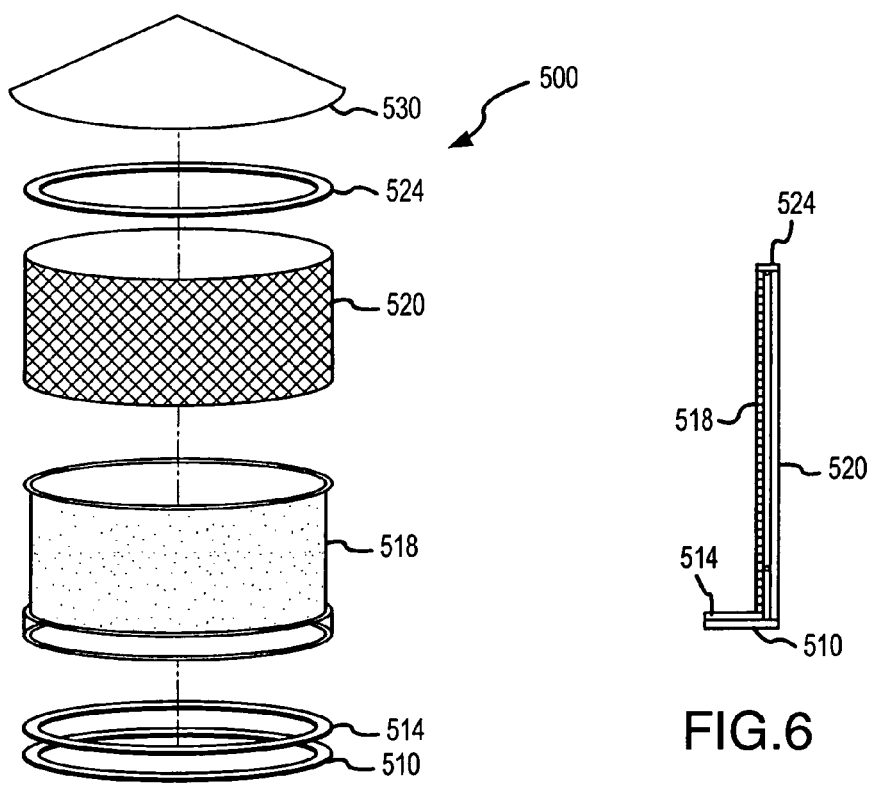
FIG.5
FIG.6
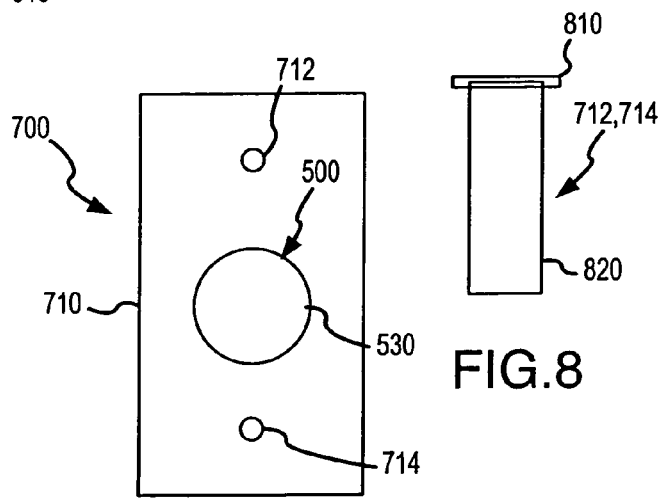
FIG.7
FIG.8

B. CEREUS SPORE VIABILITY IN ~40% LiCi AT DIFFERENT TEMPERATURES

FIG.10

PERCENT VIABLE B. CEREUS SPORES AT VARYING LiCi CONCENTRATIONS AT 60°C

FIG.11

USING LIQUID DESICCANT AS A REGENERABLE FILTER FOR CAPTURING AND DEACTIVATING CONTAMINANTS

CONTRACTUAL ORIGIN OF THE INVENTION

The United States Government has rights in this invention under Contract No. DE-AC36-99GO-10337 between the United States Department of Energy and the National Renewable Energy Laboratory, a Division of the Midwest Research Institute.

BACKGROUND OF THE INVENTION

1. Field of the Invention

The present invention relates generally to the fields of air purification and heating, ventilating, and air conditioning, and more particularly, to systems and methods for filtering or removing biological and chemical contaminants from air, such as an air stream being conditioned for input to an inhabited building or selected rooms in a building or protective shelters, and for deactivating the filtered or captured contaminants.

2. Relevant Background

Maintaining acceptable indoor air quality within commercial and residential buildings is a serious and often difficult challenge facing today's industrial society. Indoor air quality is generally the condition of air in an enclosed space with respect to contaminants or pollutants that have entered the air and that can cause health problems for inhabitants of the enclosed space. Health authorities are concerned with contaminants that are respirable particles, which are typically 10 microns or less is size, and that are often drawn into and distributed by the building ventilation system where people breathe in the contaminants. The challenge facing designers of building ventilation systems in to condition outside air to provide air with an acceptable level of contaminants for the building and to maintain an acceptable level of indoor quality for recirculated air.

To maintain indoor air quality, ventilation systems need to be adapted to control a wide variety of contaminants. In typical applications, the contaminants may include bioaerosols including allergens (e.g., pollens, fungi, mold spores, and the like) and pathogens (e.g., bacteria and viruses), respirable particles such as chemical pollutants, and vapors and gases (e.g., volatile organic compounds, radon, and the like). In recent years, the use of chemical and biological agents as weapons in war and by terrorists has given rise to a need for ventilation systems designed to harden the building against such attacks by attempting to prevent introduction of potentially deadly contaminants into a building. Examples of these agents include anthrax spores, nerve agents, mustard gas, phosgene, cyanogen chloride, chlorine, bacteria such as salmonella and *E. coli*, and viruses such as small pox. Designing a single ventilation system that effectively controls this broad spectrum of potential airborne contaminants has proven to be a very difficult task that has not yet been successfully accomplished by broadly applicable means due to the diversity in the physical and chemical characteristics of the contaminants. Many of these contaminants, such as anthrax and other spore contaminants, are notoriously resistant to deactivation by chemical, radiation, and thermal techniques.

Conventional methods of controlling contaminants include physical filtration (such as with a high efficiency particulate air (HEPA) filter), electrical filtration (such as with an electrostatic precipitator), thermocatalytic oxidation, photocatalytic oxidation, carbon adsorption, or sequential combinations of these techniques. While these methods can provide useful contaminant control, these methods are often only effective against a single contaminant or for select contaminants. Further, these existing methods often are expensive to implement and maintain and typically require significant modification and upgrades of conventional heating and ventilation systems. For example, existing military systems utilize HEPA filters for particulate contaminants in conjunction with carbon filters that handle gaseous contaminants. These multiple filter systems are large, heavy, and costly to produce, install, and maintain in part because the systems demand high fan pressure and frequent replacement. Unfortunately, most conventional heating and ventilation systems are currently not built to handle the high airflow resistance of HEPA filters and require major system modifications, such as installing additional fans, modifying duct work, and, in some cases, installing structural supports for the heavy equipment.

The existing systems fail to provide all of the desired features of a filter system (such as the design criteria presented by the United States Joint Forces Chemical/Biological Defense Command for Collective Protection as detailed in the Collective Protection Master Plan Summary, DOD Chemical & Biological Defense Program AFRL/MLQ, 139 Barnes Drive, Suite 2, MS37, Tyndall AFB, Florida USA 32403). These features include simultaneously controlling gases, aerosols, and particulates including bacteria, viruses, and spores with a single filter. Further, it is desirable that the filter provide continuous agent destruction (i.e., be regenerable) such that the filter's efficiency remains relatively constant (e.g., does not decrease over its service life such as by the filter consuming one or more essential decontaminating agents) and the filter does not require frequent maintenance, manual cleaning, and/or replacement. It is also important to minimize the need for maintenance when the filtered contaminants may be dangerous or hazardous, and in this regard, it is desirable that use of the filter does not result in a filter that has captured numerous contaminants and has become a concentrated disposal hazard.

Hence, there remains a need for an improved filter or filter system for use in building or other ventilation systems to provide protection against biological and/or chemical agents or contaminants, such as the types of contaminants that may be released in a terrorist attack. Further, it is desirable that such an improved filter or filter system meets demands for low cost, reduced size, low maintenance, and reduced energy demands. It is also desirable that the filter system be "dual use" in that it serves a useful air quality function in normal day-to-day operations as well as a protective function in a biological or chemical attack. Specifically, it is desirable that such a filter or filter system be compatible with conventional building heating and ventilation systems while providing filtration rates for contaminants that are comparable to those achieved with many HEPA filters, such as in excess of 99 percent and even in excess of 99.99 percent thereby avoiding the creation of a hazardous waste disposal problem.

SUMMARY OF THE INVENTION

The present invention addresses the above problems in large part due to the discovery that desiccant solutions, such as, but not limited to, concentrated aqueous lithium chloride (LiCl), have a strong deactivation effect against spores, such as *Bacillus* spores (which include *Bacillus anthracis* or simply "anthrax"). The present invention builds on this discovery by providing ventilation systems with liquid desiccant dehumidifier systems to effectively capture airborne contaminants including anthrax and to kill or deactivate the captured contaminants. Because it was further discovered that there is a synergistic deactivation effect between the liquid desiccant and its temperature (i.e., the application of heat), the ventilation systems of the invention improve deactivation rates by applying heat and/or controlling the temperature and by controlling flow rates of the liquid desiccant. In one embodiment, additional heat is provided by the addition of a heater used to heat liquid desiccant and capture contaminants in a recirculation line of the conditioner portion of the ventilation system and a slipstream heater for applying additional heat (e.g., above that provided by the regenerative heater) in the regenerative portion of the ventilation system.

By providing a high level of in-system deactivation, the ventilation systems of the present invention significantly reduce the risk of creating a concentrated health hazard, as was the case with simple filtration systems. Additionally, the regenerator regenerates the liquid desiccant such that the capture function of the system is continuous and does not require frequent maintenance to clean or replace filters. The deactivation and capture functions are also concurrent with each function occurring on an ongoing basis whenever the system is operating. Capture of contaminants within the conditioner portion is enhanced according to the invention by the addition, alone or in various combinations, of electrostatic precipitator components, pretreatment devices, and inertial filtering enhancement devices or inserts (such as devices to create turbulent flow). The ventilation systems of the invention further continue to utilize the liquid desiccant for conditioning or dehumidifying the intake air stream such that the ventilation systems act as dual-purpose devices to control the size and cost of the system. The present invention can be utilized in many existing buildings without significant modification of the building ventilation system, without remodeling the roof or other structural supports, and without increased maintenance and operating costs.

More particularly, a method is provided for purifying and conditioning a stream of air that contains contaminants (such as common particulates or weaponized biological or chemical agents). The method includes wetting a filter media, packing media, or filter packing media with a liquid desiccant comprising a concentration of salt. The concentration is generally less than 60 percent by weight and more typically between 40 and 45 percent with higher concentrations being preferred (e.g., the concentration is not limiting to the invention and may be varied significantly to practice the invention), and the salt may be lithium chloride (LiCl), lithium bromide (LiBr), calcium chloride ($CaCl_2$), or other salts, e.g., any Halide salt. The method includes directing the stream of air through the wetted filter packing media and concurrently, capturing a large percentage of the contaminants in the air with the liquid desiccant. Additionally, the liquid desiccant in the filter packing media is acting to dehumidify the air. The method continues with deactivating at least a portion of the captured contaminants, which typically includes heating the liquid desiccant to achieve the synergistic effects of the liquid desiccant salt and the heat acting on the contaminants. The liquid desiccant is regenerated by applying a quantity of heat to the liquid desiccant and then removing moisture from the liquid desiccant. The method also includes repeating the wetting with the regenerated liquid desiccant, thereby providing a regenerable filtering process that captures and deactivates contaminants on an ongoing basis while also conditioning the air. The method may further include ionizing contaminants in the air and simultaneously or sequentially electrostatically precipitating contaminants (such as those not captured by the inertial filtration). The method may also include pretreating the air, such as by fogging, applying additives to the contaminants, and/or saturating the air and/or include enhancing inertial filtration such as by creating a pressure drop at the air intake or by creating turbulent flow in the air within the filter packing media.

According to another aspect of the invention, an apparatus is provided for conditioning air and for capturing and deactivating biological and chemical contaminants in the air. The apparatus includes a filter with a plurality of contact surfaces and an air intake for gathering or drawing in the air and then directing the air into the filter. A distribution manifold is provided for distributing a liquid desiccant over the filter at a flow rate sufficiently large to wet a large portion of the contact surfaces. The liquid desiccant has a concentration of salt (such as LiCl, LiBr, $CaCl_2$, and the like at a concentration between 20 to 60 percent or greater by weight) and is typically provided at an elevated temperature to enhance deactivation of the contaminants (such as anthrax). The apparatus further includes a conditioner sump for collecting the liquid desiccant that has passed through the filter and captured the contaminants. A recirculation pump is provided to pump liquid desiccant from the conditioner sump back to the distribution manifold. The apparatus includes a regenerator that pumps diluted liquid desiccant from the condenser sump and returning regenerated liquid desiccant. During operation, the regenerator removes water absorbed by the liquid desiccant solution in the conditioner unit. The regenerator includes a heater for applying heat to the diluted liquid desiccant and a contact media for removing moisture from the heated liquid desiccant.

In one embodiment, a pair of capture filters are positioned upstream of the distribution manifold and a valve is provided for selectively directing flow away from one of the capture filters. A filter heater is included in the apparatus for applying heat to at least the one filter to which flow has been temporarily blocked. Typically, the temperature is raised by the filter heater to a temperature (such as a deactivation temperature) that is high enough to deactivate the contaminants within the liquid desiccant in the filter during the time the flow is blocked. The apparatus may include an electronic air filter for charging incoming contaminants and for removing via electric attraction a portion of the charged contaminants. A pretreatment device may also be provided to treat the incoming air to enhance capture, such as by fogging, by condensing, or by introducing additives. In some embodiments, an inertial filtering enhancement device is positioned within the filter so as to contact the filtering packing media, to create turbulence in the air within the filter adjacent the device, and to direct liquid desiccant flow to contact the turbulent air, thereby enhancing contaminant capture.

BRIEF DESCRIPTION OF THE DRAWINGS

FIG. 5 is a partial exploded view of one embodiment of the filtration enhancement insert shown in FIG. 4;

FIGS. 6-8 are top and side views of the filtration enhancement insert and its components providing additional design features of this embodiment of the insert;

FIGS. 10-13 illustrate graphically the results of testing using liquid desiccant with varying salt (i.e., LiCl) concentrations for capturing and deactivating anthrax surrogates, i.e., *Bacillus cereus* and *Bacillus subtilus*, within a ventilation system, such as those shown in FIGS. 1-4 and FIG. 9 under various concentrations and liquid desiccant temperatures.

DETAILED DESCRIPTION OF THE
PREFERRED EMBODIMENTS

The present invention is directed toward ventilation systems that serve the dual-purposes of conditioning or dehumidifying air and, more significantly, systems that purify the air of a wide range of airborne contaminants with the use of a regenerable liquid desiccant. In this regard, the inventors evaluated the capabilities of modified liquid desiccant dehumidification systems to directly capture and deactivate aerosolized and gaseous contaminants. For example, deactivation rates for *Bacillus* spores of the type used in aerosol form as weapons were found, when exposing the spores to salt solutions of the type used in desiccant humidifiers, to be in excess of 99.99 percent for the anthrax surrogates *Bacillus cereus* and *Bacillus subtilus*, and these results, which are surprising as these spores are notoriously resistant to deactivation by chemical, radiation, and thermal techniques, are discussed in detail with reference to FIGS. 10-13.

Figure 1:
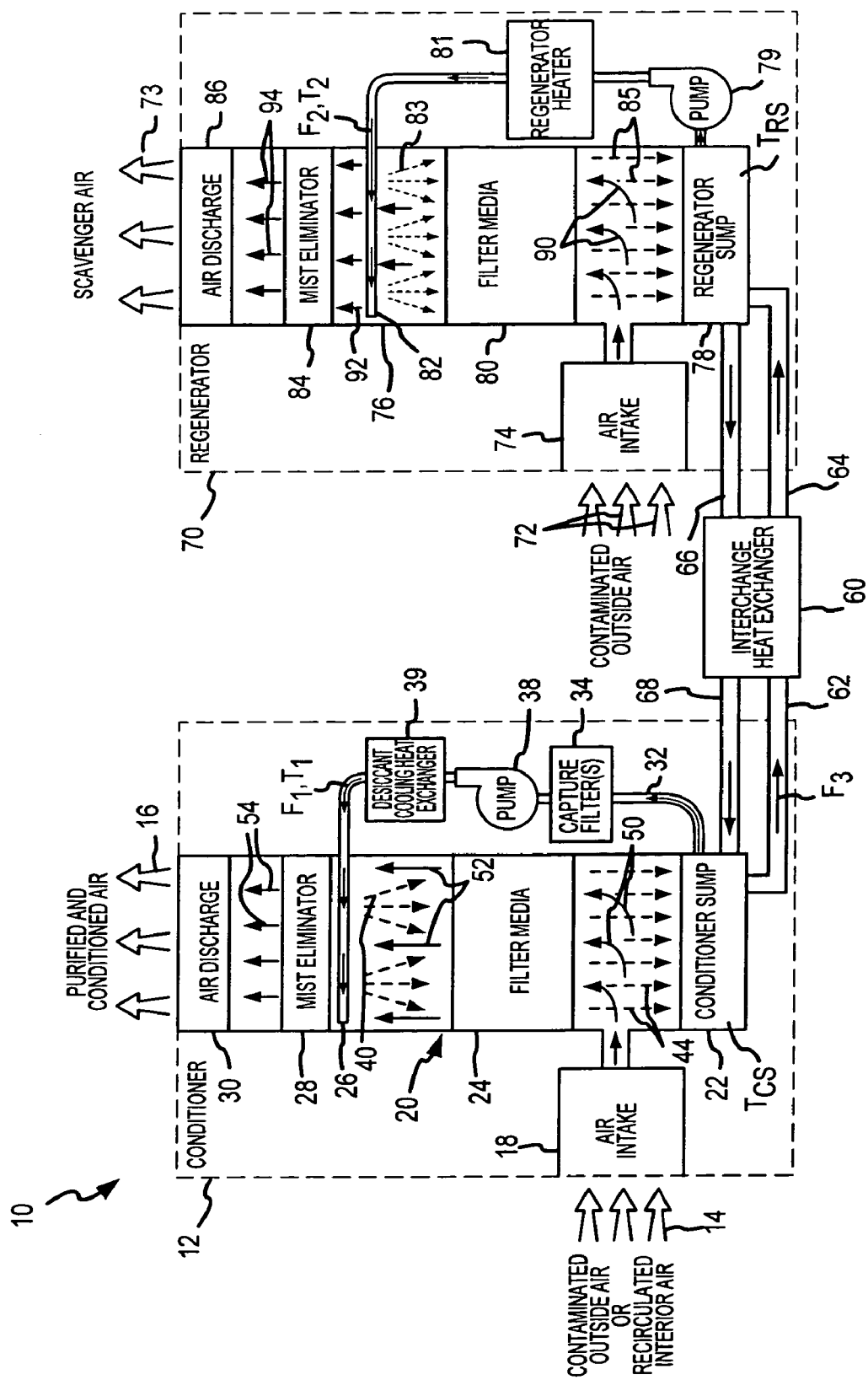
FIG. 1 is a schematic illustrating air and liquid desiccant flow in a dual-purpose purifying and conditioning ventilation system according to the present invention.

The following description begins with a description of a relatively basic ventilation system that can be used to capture and kill or deactivate airborne contaminants with reference to FIG. 1. The description then continues, with reference to FIGS. 2-8, by describing a number of embodiments in which additional components have been added to the base system of FIG. 1 to increase the deactivation and/or the capture effectiveness of the system. An alternative ventilation system that utilizes lower desiccant flow rates is then described with reference to FIG. 9. Following the description of these exemplary systems, FIGS. 10-13 are discussed to explain the tested effectiveness of liquid desiccant in the ventilation systems of the invention in capturing and deactivating particular contaminants (i.e., anthrax surrogate spores). Finally, the general process of using liquid desiccant as a regenerable filter for contaminants is described with reference to FIG. 14. The ventilation systems of the invention are described stressing the use of concentrated LiCl liquid desiccant for effectively capturing and killing spores, such as anthrax, but it will be understood that the systems are useful with numerous liquid desiccants having a concentration of salt (such as, but not limited to lithium bromide solution, calcium chloride, and the like) and ranges of additive concentrations for capturing and deactivating a wide range and variety of contaminants. Because liquid desiccant systems are designed to effectively pull moisture vapor from air, the liquid desiccant systems and components of the invention have mass transfer features useful in capturing contaminants, such as gaseous weapons including phosgene, chlorine, nerve agents, and the like, while the filter packing media and capture enhancement components act alone and in combination to provide collection efficiencies comparable with HEPA filtration rates, e.g., in excess of 99.99 percent.

FIG. 1 shows a conditioning and purifying ventilation system 10 according to the present invention configured to use liquid desiccant as a regenerable filter for capturing and deactivating contaminants. The system 10 is modeled generally upon a conventional liquid desiccant dehumidification system (such as an industrial packed tower scrubber or air washer design) and includes a conditioner 12 and a regenerator 70. As with conventional systems, the system 10 provides the function of conditioning the air 14 and outputting dehumidified air 16 to an interior space via air discharge 30. To this end, concentrated or dry liquid desiccant is recirculated through the conditioner 12 and sprayed countercurrent to the flow of the intake air 14 to remove moisture from the air 14. To regenerate the system 12, diluted or wet liquid desiccant is recirculated through the regenerator 70 where heat is applied and the desiccant is sprayed over outside air 72 to release absorbed water or moisture which is discharged in scavenger air 73 to reconcentrate the liquid desiccant for reuse in the conditioner 12. Interchange flow carries diluted desiccant from the conditioner 12 to the regenerator 70 and concentrated desiccant back from the regenerator 70 to the conditioner 12 to maintain steady, regenerable operations.

Potentially contaminated air or contaminated air 14 is drawn into the conditioner via air intake 18, which may include a fan and ductwork. The system 10 may be utilized as part of a building ventilation system for hardening or securing the building and as such the intake air 14 may be the only intake air for the building with a positive pressure being created in the building (as is well known in the ventilation arts and not described in detail here) such that air is not drawn into the building at other locations. The source of the air 14 may also be recirculated air from interior sources with the system 10 being used to quickly purify an interior space, such as one that is determined to be a critical space that needs to be protected against attack or in which pure air is deemed more critical. Of course, more than one system 10 may be utilized in a building to provide purified and conditioned air to one or more spaces (or one or more conditioners 12 and/or regenerators 70 may be combined in a system 10), and these alterations are considered within the bounds of the described invention.

As illustrated, the contaminated air 14 is passed from the air intake 18 into a conditioner tower 20 and flows upward through a filter packing media 24. The filter packing media 24 may take a number of forms useful for providing a desirable liquid-to-air contact area for effective mass (e.g., water vapor) exchange leading to contaminant capture. For example, the filter packing media 24 may be a plastic or ceramic media (or other material resistant to corrosion when exposed to the liquid desiccant and air) useful in air washer and scrubber applications such as structured packing (e.g., Pall rings, Berl saddles, Intalox saddles or snowflakes, and the like) with an appropriate support grid or structure. The liquid desiccant 40 is sprayed by distribution manifold 26 (which may include openings and/or nozzles) over the filter packing media 24 at a flow rate, $F_1$, selected in part to be large enough to at least wet the media 24 surfaces to improve contaminant capture in the system 10.

After flowing through the media 24, the liquid desiccant 44 with captured contaminants is collected by the conditioner sump 22. The liquid desiccant is recirculated via return line 32 and pump 38 to the manifold 26. The liquid desiccant is passed through capture filter(s) 34 which filters captured contaminants over a selected size. For example, in one embodiment, a 0.5-micron filter is utilized for capture filter 34 to filter out spores and other particles that are 0.5 microns or larger in size (such as anthrax spores). Note, as will be explained fully, it is not necessary that all contaminants be filtered out of the liquid desiccant by the filter 34 because the system 10 is configured to provide kill or deactivation throughout the system 10 (i.e., by the combination of the chemistry of the liquid desiccant and the temperature of the desiccant at various locations within the system 10). A desiccant cooling heat exchanger 39 is provided to remove heat (i.e., control the temperature of the liquid desiccant in the conditioner 12) from the liquid desiccant prior to spraying it over the filter packing media 24. Although not shown, the heat from the liquid desiccant is typically removed in the heat exchanger 39 by the exchange of heat with a fluid at a lower temperature, such as chilled water or cooling tower water.

The purified air 52 is then passed through a mist eliminator 28, which is included to eliminate mist in the air 52 to control passing the liquid desiccant (such as LiCl), which can be highly corrosive to nearly all metals, to the HVAC ductwork and building structural materials via the discharged air 16. The use of a mist eliminator 28 further reduces the risk that contaminants captured in the liquid desiccant 40 would be emitted in the air 16. The de-misted air 54 then passes through the air discharge 30 as purified and conditioned air 16 to an interior space, directly or via additional HVAC ductwork and components. Another benefit of using liquid desiccant in the tower 20 (and in the system 900 of FIG. 9) is that it improves any potential contaminant sorption efforts downstream because of the reduction in competitive sorption with water vapor.

The regenerator 70 is included in the system 10 to regenerate the liquid desiccant 40 passed over the filter packing media 24 in the conditioner 12. In this regard, the conditioner sump 22 is linked via discharge lines 62 and 64 and return lines 66, 68 with the regenerator 70 and, more particularly the regenerator sump 78. In the illustrated embodiment of system 10, an interchange heat exchanger 60 is provided between the discharge and return flows of the liquid desiccant to preheat desiccant going to the regenerator 70 and to pre-cool desiccant going to the conditioner 12, thereby increasing energy efficiency of the system 10. The regenerator sump 78 is connected to a pump 79 that provides a flow rate, $F_2$, in the regenerator 70 and forces the diluted liquid desiccant through a regenerator heater 81 that supplies thermal energy to the liquid desiccant to increase its temperature to a regeneration temperature, $T_2$, and regenerate the liquid desiccant.

The liquid desiccant 83 is sprayed via distribution manifold 76 over a filter packing media 80 (typically, but not necessarily, similar in configuration and material as the filter packing media 24) to wet the media 80. From the air intake 74, the air 90 is directed up through a tower 76 of the regenerator 70 through the filter packing media 80 to remove moisture from the heated desiccant 83 on the surfaces of the media 80. The moisture-laden air 92 is then passed through a mist eliminator 84 that (as with the conditioner 12) is provided to control release of liquid desiccant to control corrosion in downstream components and ductwork. The de-misted air 94 then passes through the air discharge 86 to be released as scavenger air 73. Regenerated liquid desiccant 85 is collected in the regenerator sump 78 and returned to the conditioner sump 22 via the return lines 66 and 68 and on the return loop is cooled in the interchange heat exchanger 60 by releasing heat to the dilute liquid desiccant carried in lines 62, 64. Flow 66 is typically provided by pump 79 (e.g., as a slipstream off the outlet (not shown)). Similarly, flow 62 is typically provided by pump 38 (e.g., as a slipstream off pump 38 before the heat exchanger 39). Outside air 72 is shown being drawn into the regenerator 70 but some embodiments may utilize previously purified interior space air. The outside air 72 may be contaminated as is air 14, and the system 10 is configured to effectively deactivate or kill contaminants captured in the regenerated liquid desiccant 90 by controlling temperatures at various locations within the system 10 and controlling flow rates of liquid desiccant to match deactivation or kill times for the particular liquid desiccant being used and anticipated contaminants.

Although specific capture and kill results are discussed in detail with reference to FIGS. 10-13, it is useful now to note that the system 10 is effective at concurrently capturing and deactivating a wide range of airborne contaminants. The effectiveness of the system 10 is achieved by the synergistic effects on the contaminants of the use of a liquid desiccant with a high salt concentration (such as concentrations of LiCl, LiBr, $CaCl_2$, or any Halide salt) and the addition of heat. The heat generally is added by controlling the temperature of the liquid desiccant at various locations in the system 10, which is achieved through the provision of heater 81 and interchange heat exchanger 60 and the control of flow rates with pumps 38 and 79. The flow rates of course are also selected to fully wet the filter packing media 24, 80 and to support the air flow rates through the conditioner 12 and regenerator 70. For example, the set of flow rates that is useful for a typical 2000 cubic feet per minute (CFM) conditioner may not necessarily be appropriate for another conditioner operating at a different air flow rate, but generally, a higher air flow rate would lead to a higher liquid desiccant flow rate to keep the media 24 wetted.

With these design stipulations in mind, the following is a set of operational parameters that are useful for a system 10 that is utilizing LiCl solution as the regenerable liquid desiccant and that is operating with approximately 2000 CFM air flow through the conditioner tower 20. The LiCl liquid desiccant 40 being sprayed over the filter packing media 24 can range in concentration and is preferably as high as practical to enhance deactivation of captured contaminants while controlling crystallization of the Halide salt being used. In one embodiment, the concentration of LiCl in liquid desiccant 40 is maintained in the range of about 0 to about 45 percent by weight, and in another embodiment the concentration of LiCl is maintained in the range of about 40 to about 45 percent by weight. The temperatures of the liquid desiccant at various points in the system 10 are: (a) $T_1$ in the range of about 10 to 30° C.; (b) $T_2$ in the range of about 40 to 100° C.; (c) $T_{CS}$ in the range of about 30 to 40° C.; and (d) $T_{RS}$ in the range of about 40 to 75° C. The flow rates of the liquid desiccant in the system 10 are: (a) $F_1$ in the range of about 10 to 20 gallons per minute (GPM) and more preferably about 15 GPM; (b) $F_2$ in the range of about 5 to 15 GPM and more preferably about 11 GPM; and (c) $F_3$ in the range of 0.5 to 8 GPM and more preferably in the range of about 1 to 4 GPM.

Figure 2:
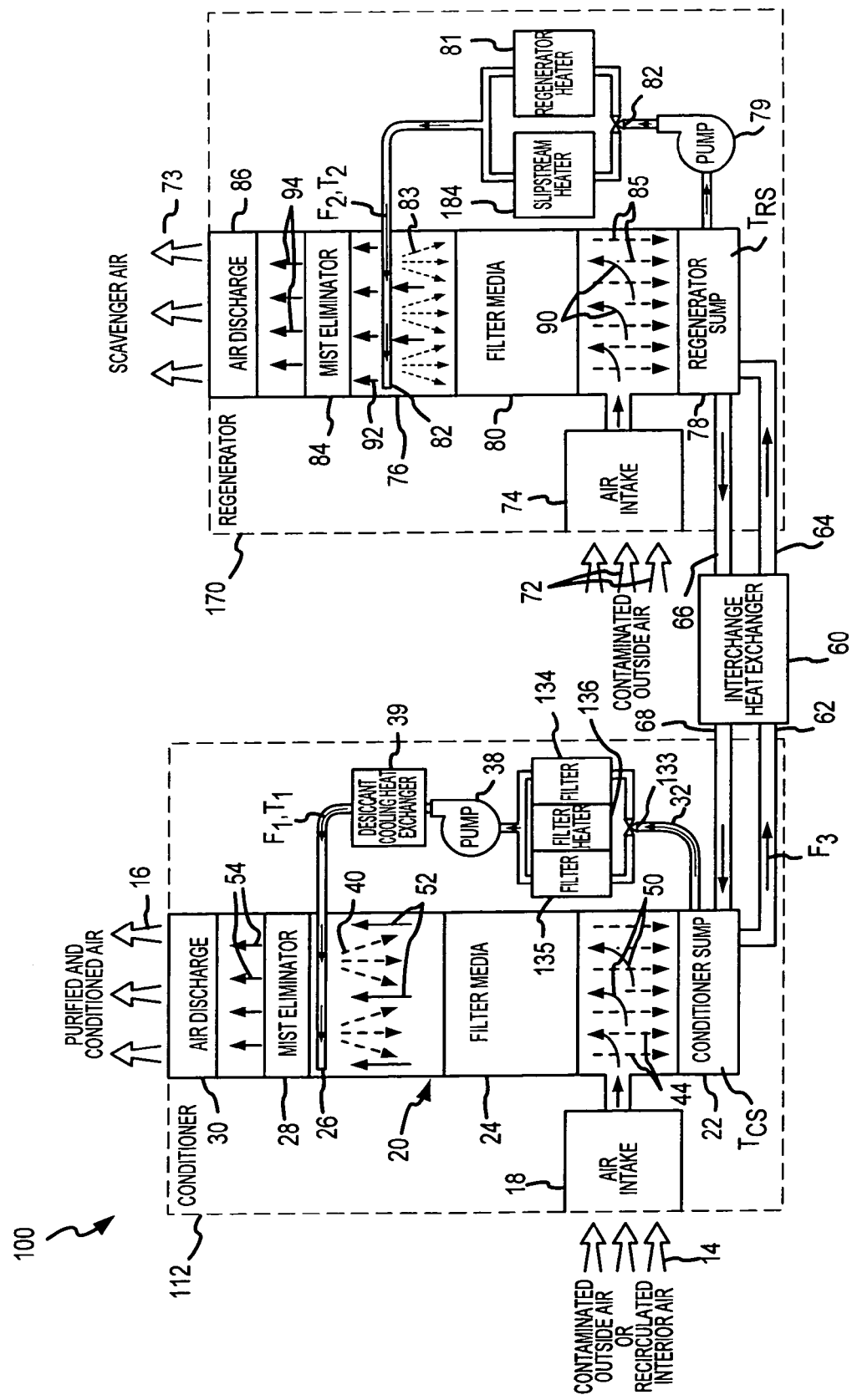
FIG. 2 is a schematic similar to FIG. 1 illustrating a second embodiment of a purifying and conditioning ventilation system according to the present invention adapted with a filter heater in a conditioner and an additional heater in a regenerator to provide improved deactivation or kill of captured contaminants.

While the system 10 of FIG. 1 is useful for purifying and conditioning intake air 14, modifications can be made to further enhance the deactivation of contaminants or the capture of the contaminants. FIG. 2 illustrates such an improved system 100 in which modifications to the system 10 have been made to improve the deactivation efficiency by better controlling the temperatures of the liquid desiccant and by allowing additional quantities of heat to be applied to the liquid desiccant to quicken the deactivation of the captured contaminants. The system 100 is configured to take advantage of the direct relation between kill rates and temperature of the liquid desiccant.

Since the conditioner recirculation flow, $F_1$, is much larger than the interchange flow, $F_3$, the system 100 is adapted to minimize the risk that active contaminants that are captured in the liquid desiccant 44 would be reintroduced to the tower 20 (even though emission via the mist eliminator 28 and air discharge 30 are unlikely). In one embodiment (not shown), the conditioner sump 22 is adapted to encourage larger contaminants or particles to settle in the sump 22 where the settled contaminants are exposed to permanent residence time in the salt solution of the liquid desiccant. Such a design of the sump 22 would likely deactivate contaminants but such deactivation may take a relatively long period of time (such as hours or days).

In contrast, as shown, the conditioner 112 includes a pair of capture or desiccant filters 134 and 135 with a valve 133 controlling the flow of liquid desiccant via line 32 to the two filters 134, 135. The control valve 133 is preferably operated to direct flow to one filter 134 or 135, which would filter the entire desiccant recirculation flow, $F_1$, at any particular time. The filters 134, 135 are preferably sized to be useful in filtering particles in the size range anticipated for weaponized contaminants, such as 0.5 micron or smaller filters. A filter heater 136 is provided for heating concurrently or separately the filters 134, 135 to elevate the temperature of the liquid desiccant and contaminants captured in the desiccant and by the filter to a temperature selected for its usefulness for more rapidly deactivating the contaminants (such as a temperature equal to or greater than $T_1$ and up to 100° C. or more but less than a destabilization temperature for the liquid desiccant). In one embodiment, the filter heater 136 is operated to heat the liquid desiccant and captured contaminants to a temperature in the range of about 60 to about 120° C. The flow would be alternated between the filters 134, 135 by the control valve 133 periodically depending on the temperature selected for the capture filters 134, 135 but preferably at least with a period that is adequately long (based on the liquid desiccant, the elevated filter temperature, and the anticipated contaminants) to ensure deactivation of the contaminants within the filter 134 or 135 that is being blocked from flow, such as periods of 2 to 6 hours or some other useful time period depending on the temperatures used and the contaminants being deactivated.

The desiccant cooling heat exchanger 39 is operated (such as at higher cooling water flow rates) to remove excess or unwanted heat from the liquid desiccant added by the filter heater 136 to maintain a desired desiccant solution temperature, $T_1$.

To enhance deactivation within the regenerator 170, a slipstream heater 184 with a control valve 182 is provided parallel to the regenerator heater 81. The slipstream heater 184 is sized to put a small portion of the recirculation desiccant flow, $F_2$, through a similar time and temperature profile as is achieved in the filters 134, 135. Flow through the primary regenerator heater 81 is modulated by control valve 182 such that the total regeneration energy added by both heaters 81, 184 is appropriate to maintain the system 100 in steady operation, i.e., providing desired regeneration of the liquid desiccant returned via lines 66, 68 and maintaining desired desiccant temperatures in the system 100.

In some applications, the capture effectiveness of the systems 10 and 100 can be improved by the addition of one or more components in the conditioner portion to treat contaminants in the intake air 14 and/or to create desired flow characteristics in the conditioner tower 20. One technique of improving the capture function of the systems 10 and 100 is to implement an electrostatic subsystem or electronic air filter within the tower 20 that uses the precipitation principle to collect airborne particles. Generally, the systems 10 and 100 can be modified to include one or more of the known types of electronic air filters such as ionizing-plate filters, charged-media non-ionizing units, and charged-media ionizing (the operation of each is well-known in the air cleaning industry and is, therefore, not explained in detail here). The task of implementing one of these electronic air filters is complicated by the fact that salt solutions severely corrode most metals. Using the filter packing media 24 itself is an option (not shown) that may be utilized such as by implementing a charged-media non-ionizing filter or a charged-media ionizing filter. The packing in media 24 may be formed of titanium (but this is an expensive solution) or electronically conductive plastics or polymer coatings like polyaniline, polyacetylene, polythiophene, fluorophenylthiophene, polypyrrole, and electroluminescent polymers may be used.

Figure 3:
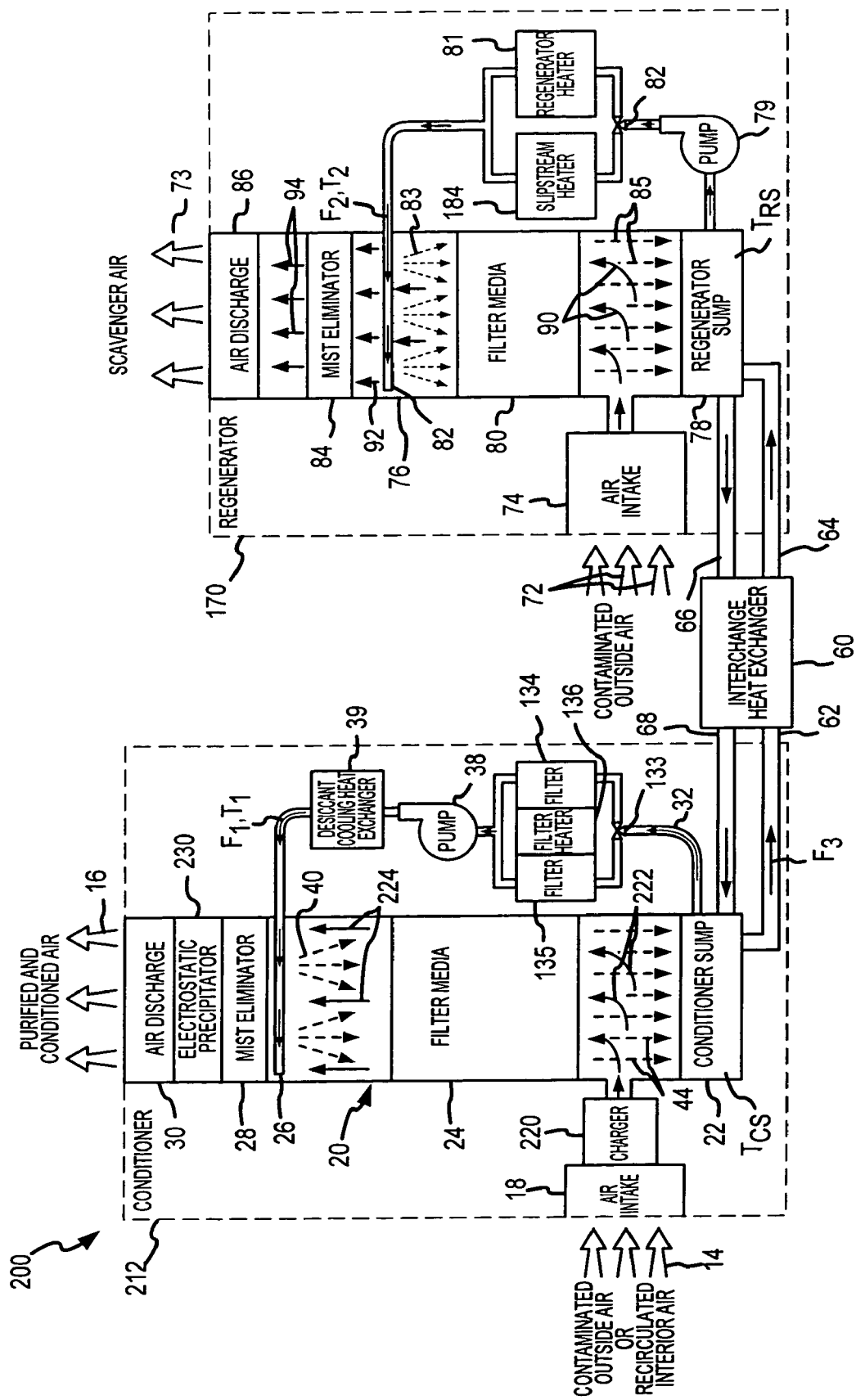
FIG. 3 is a schematic similar to FIGS. 1 and 2 illustrating a third embodiment of a purifying and conditioning ventilation system according to the present invention further adapted with an electrostatic precipitator for further enhancing capture of contaminants within the conditioner of the ventilation system.

As shown in FIG. 3, the corrosion issues are addressed in the system 200 by implementing an ionizing-type electronic air filter in conditioner 212 having two parts (although in some embodiments a single stage electrostatic precipitator (ESP) may be installed downstream of the filter packing media 24 and preferably downstream from the mist eliminator 28). A charger 220 is provided in the conditioner 212 between the air intake 18 and the tower 20 (although charging could be performed within the media 24). The incoming air 14 passes through a series of high-potential ionized wires (or plates) in the charger 220 that generate positive ions that adhere to the contaminants carried in the air 222. The air with charged contaminants 222 then passes through the filter packing media 24 where some enhancement of capture can be expected due to the greater attraction of the ionized contaminants with the liquid desiccant 40 on the media 24 surfaces. More importantly, though, an electrostatic precipitator 230 is provided. downstream of the mist eliminator 28 and the filtered air 224 is passed through the precipitator 230. The precipitator 230 may take a number of forms and configurations but generally, the charged contaminants are passed through an electric field in the precipitator 230 that attracts the charged contaminants to attracting plates (or grids and the like). The plates typically are arranged to offer little resistance to air flow and are typically evenly distributed in the precipitator 230. The plates may be coated with water to act as an adhesive for the charged contaminants, and the plates are periodically cleaned by use of water or other liquid sprayed on the plates of the precipitator 230 which drains into the sump 22 (flushing may be performed manually during maintenance periods or with the use of an automated flushing device (not shown) mounted on the tower 20).

Figure 4:
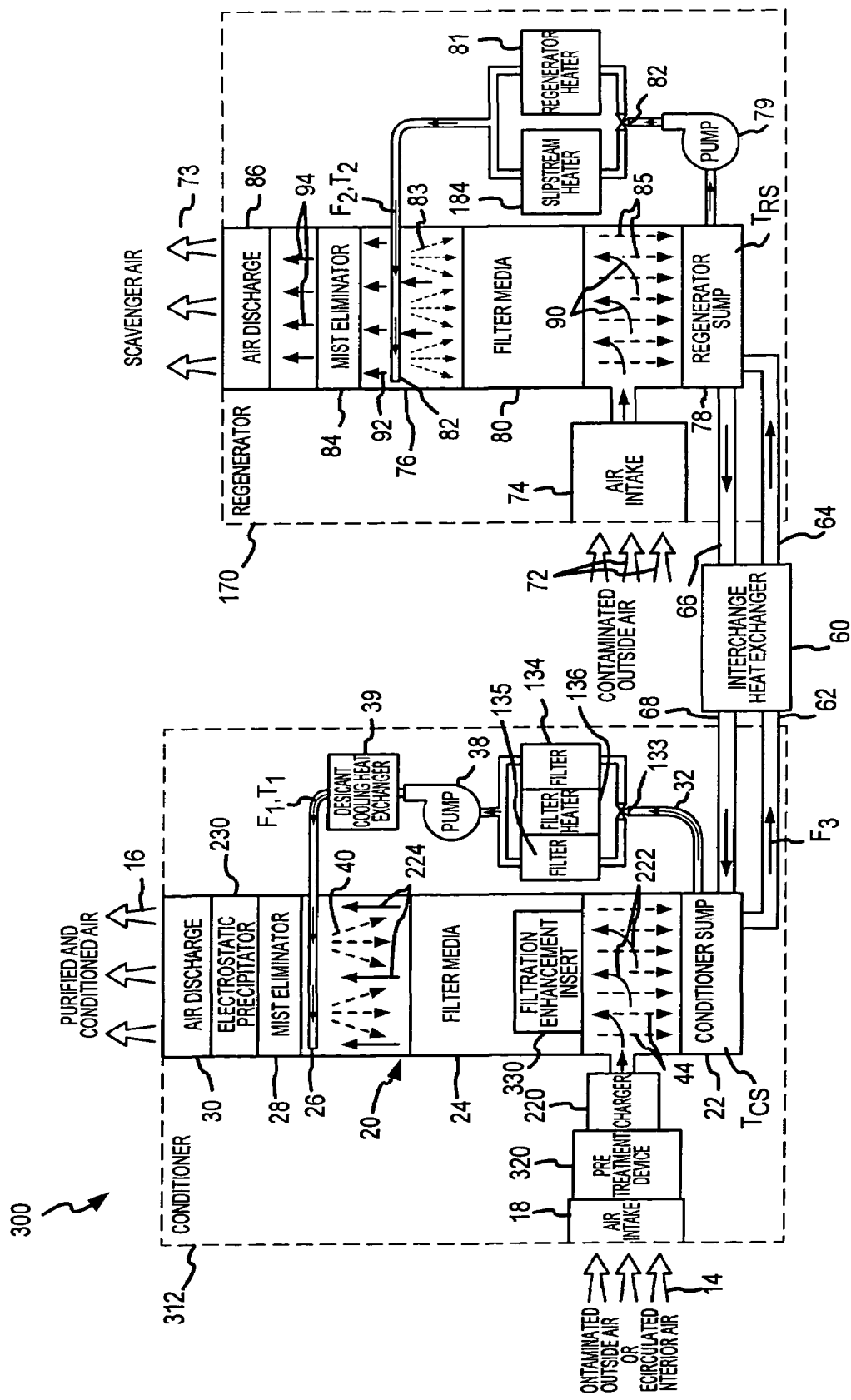
FIG. 4 is a schematic similar to FIGS. 1-3 illustrating a fourth embodiment of a purifying and conditioning ventilation system according to the present invention that is still further adapted with a pretreatment device for enhancing contaminant capture within the conditioner and a filtration enhancement insert for creating turbulent flow within the filter packing media for enhancing contaminant capture within filter packing media in the conditioner.

Another technique for improving capture according to the invention is to treat the incoming air 14 and/or to create turbulent airflow within the tower 20 to increase inertial filtration effectiveness. As shown in FIG. 4, the ventilation system 300 provides improved capture by providing a conditioner 312 that includes a pretreatment device 320 between the air intake 18 and the tower 20 (and also upstream of the charger 220 but this is not required). The pretreatment device 320 may provide a number of treatments such as fogging to enhance the performance of the electrostatic precipitator 230. Alternatively (or additionally), the pretreatment device 320 may include components for applying additives to contaminants in the air 14 to alter contaminant particle surface properties for improved collection in the filter packing media 24 (especially, when the media is electrostatically enhanced). The additives may include chloride salts of magnesium or aluminum, lithium or sodium salts of anions such as sulfate, phosphate, or pyrophosphate, or other useful additives. The pretreatment device 320 may further act as a condenser to increase the effective aerodynamic diameter of the contaminant particles to increase effectiveness of the liquid desiccant capture in the filter packing media 24 (e.g., larger diameter particles are more readily captured by the liquid desiccant).

One way to improve the inertial filtration achieved within the filter packing media 24 is to select a desirable packing void fraction. Generally, the tighter the packing in media 24, the greater the pressure drop and air turbulence within the media 24 which augments inertial deposition in the liquid desiccant on the wetted surfaces of the media 24. Of course, the amount of pressure drop is preferably balanced with the pressure drop or fan capacity of the conditioner 312 to limit the need for modifying the downstream HVAC system receiving the purified air 16. Another option for improving the level of inertial filtration is to provide the filtration enhancement insert 330 within the structured packing or filter packing media 24 to produce turbulence in proximity to the wetted surfaces of the media 24 adjacent the sides of the insert 330.

FIGS. 5-8 illustrate one useful embodiment of such insert 700. FIG. 7 illustrates a top view (i.e., looking downward within the tower 20) of the assembled insert 700. The insert 700 includes a plug 500 that is mounted onto a mounting plate 710, which in turn can be mounted to the support structure (not shown) for the filter packing media 24. The mounting plate 710 can be solid to block air flow 222 upward into the media forcing the air 222 to flow through the plug 500 and out of the side plate 518 and filter 520 to create turbulent flow. The liquid desiccant flow 40 is forced to flow over the cap 530 into the media 24 adjacent the side plate 518 and filter 520, i.e., into the turbulent air 222, and then to flow out of drain pipes 712, 714 that extend outward below the plate 710 toward the sump 22 and below the liquid surface of the sump 22. The drain pipes 712, 714 include an upper mounting plate 810 and pipe 820.

The plug 500 includes cap 530 which provides a downwardly sloped surface for directing liquid desiccant 40 in the media 24 and which preferably extends outward from the side plate 518 and filter 520 when the plug 500 is assembled. The plug 500 further includes mounting rings 510, 514 (such as for positioning on opposing sides of plate 710 to mount the plug 500 to plate 710), perforated side plate 518, filter 520, and sealing flange 524. The plug 500 is mounted in tower 20 such that all or substantially all of the air 222 goes through the perforated side plate 518 and through filter 520, which produces turbulence in the air in the adjacent media 24 without the side plate 518 becoming wetted with the liquid desiccant 40. The side plate 518 is shielded from desiccant flow by the overhang or extension of the cap 530 and by the adjacent filter 520 (such as a layer of plastic mesh). Maintaining dry perforations in the side plate 518 is important because droplets or mist would likely be generated to an unacceptable extent if desiccant was allowed to pass over the perforations or holes in the plate 518 and then shattered or impacted by the air coming out of the holes at a high velocity. The plug 500 may extend upward within the media for a fraction of the media 24 (as shown for insert 330 of FIG. 4) or extend upward out of the packing of filter packing media 24 such that the cap is partially or fully above the upper level of the media 24.

Figure 9:
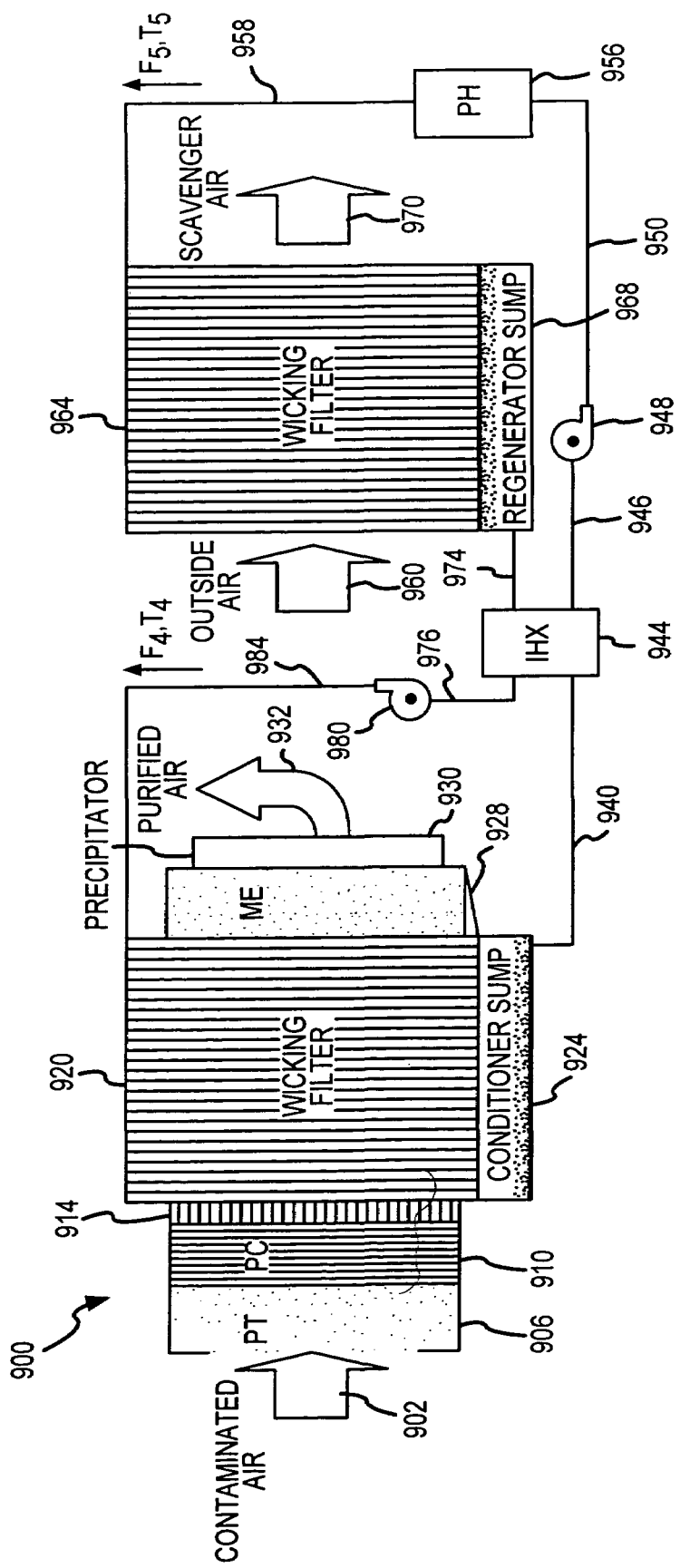
FIG. 9 is side-view schematic of an alternative embodiment of a purifying and conditioning ventilation system according to the invention utilizing a liquid desiccant system with a wicking conditioner and a wicking regenerator and with enhanced capture components to effectively capture and deactivate contaminants with liquid desiccant (while not shown the embodiment of FIG. 9 may be modified to include the modifications of FIGS. 2-4)

The use of liquid desiccant for capturing and deactivating airborne contaminants is not limited to the packed tower configurations such as those described with reference to FIGS. 1-8. FIG. 9 illustrates a ventilation system 900 that utilizes liquid desiccant as a regenerable filter for airborne contaminants and that is modeled upon a parallel plate or wicking filter conditioner and/or regenerator. The general operation and configuration of such parallel plate liquid desiccant dehumidifiers are known in the arts (e.g., as such systems are configured according to the invention to capture and deactivate contaminants). For more explanation on operating parameters and useful components and configurations for such systems, see U.S. Pat. No. 5,351,497 issued to Lowenstein, which is hereby incorporated in its entirety by reference.

The system 900 includes a wicking filter, wicking surface, or filter contact surface 920 in its conditioner portion to contain the liquid desiccant which is pumped to the filter contact surface 920 via line 984 by pump 980 at a given flow rate, $F_4$, and temperature, $T_4$. The filter contact surface 920 typically includes a number of parallel, elongate plate surfaces that provide the mass exchange area between the air 902 and the liquid desiccant that is distributed at the top of the filter contact surface 920 and then captured in the conditioner sump 924. Potentially contaminated air 902 is forced to flow through or across the plates of the filter contact surface 920 where contaminants are captured in the liquid desiccant. The flow rates of the air 902 and the desiccant, $F_4$, are typically kept relatively low to avoid high flooding rates in the conditioner and to avoid generating desiccant droplets that could be aerosolized and discharged in the purified air 932, thereby eliminating the need for a mist eliminator (although a mist eliminator 928 may be included to provide an even higher level of assurance of contaminant capture). In some embodiments, the plates of the filter contact surface 920 are internally cooled or heated with water or other fluids to eliminate the need for external conditioner filter heaters and regenerator heaters or heat exchangers.

The regenerator portion of the system 900 is configured similarly with a wicking filter or filter contact surface 964 across which outside air 960 is passed to remove moisture from the liquid desiccant provided at a flow rate, $F_5$, and at a temperature, $T_5$, in discharged scavenger air 970. A regenerator sump 968 captures the regenerated liquid desiccant which is pumped via lines 974 and 976 to the pump 980 for return to the conditioner of system 900. The system 900 generally also includes discharge lines 940, 946, 950, 958, interchange heat exchanger 944, discharge or circulation pump 948 and preheater 956. The preheater 956 is operated in some embodiments to increase the kill rate of the system 900. The preheater 956 is sized to bring the entire interchange flow, $F_5$, up to a desired elevated temperature (i.e., greater than $T_1$ and up to 100° C. or more, such as in the range of 60 to 120° C.). Any steam generated in such a preheater 956 may be fed into the regenerator internal heating channels of the plates of wicking filter 964 for a second stage of regeneration, with steam flow and heating being modulated or controlled to maintain the system 900 in a relatively steady operational state.

The system 900 is configured to have much lower flow rates than the systems of FIGS. 1-4, which generally leads to effective kill rates without the need for additional heaters (i.e., the time which captured contaminants are exposed to the temperatures is increased and high temperatures are not as important). Generally, the flow values in system 900 are about 5 percent of those found in the systems of FIGS. 1-4 while temperatures are similar. For example, in one embodiment of the system 900, desiccant flow rate, $F_4$, is in the range of about 0.5 to 1 GPM; desiccant flow rate, $F_5$, is in the range of about 0.25 to 0.75 GPM; liquid desiccant temperature, $T_4$, is in the range of about 10 to 30° C.; liquid desiccant temperature, $T_5$, is in the range of about 40 to 100° C.; condition sump 924 temperature is in the range of about 30 to 40° C.; and regenerator sump 968 sump is in the range of about 40 to 75° C.

As with the packed tower configurations of FIGS. 1-4, the system 900 preferably includes one or more components to enhance capture of contaminants that may be used individually or in various combinations. As shown, the system 900 includes a pretreatment device 906, a charger 910, and an inertial filtration enhancement component 914 on the upstream side of the wicking filter 920 and a precipitator 930 downstream of the wicking filter 920. As with the systems of FIGS. 1-4, the charger 910 and precipitator 930 act in conjunction to ionize contaminants in air 902 and to attract and then capture charged contaminants. Note, the parallel plate configuration of the wicking filter 920 is more similar to conventional electronic air filter designs, which lends the media of the filter 920 to being used as a single stage ESP (or the liquid desiccant itself can act as the collection surface when the contaminants are ionized). In such embodiments of the system 900, the plates of the wicking filter 920 can be made of conductive plastic or the plates may be coated with conductive, corrosion-resistant materials or flocking (or even the adhesive for the flocking) that forms the wicking surface on the plates may be conductive. Alternatively, the plates, the flocking, and/or the adhesive can be modified with carbon black or other conductor to make the plate surfaces suitable for electrostatic enhancement.

The pretreatment device 906 again can provide fogging, act to saturate the air 902, and/or apply additives to contaminants in the air 902 to enhance capture by the liquid desiccant and/or the precipitator 930. Because wicking filter 920 creates little turbulence in the air and has a low pressure drop, an inertial filtration enhancement component 914 can be included upstream of the filter 920 or within the filter 920 to induce turbulence in the air 902 flowing into the filter 920 at the wetted surfaces to increase inertial filtration in the filter 920. Although not shown in FIG. 9, it will be understood that typically fluid loops or water loops or piping are provided to allow fluid such as water to flow within the flat plates of wicking filters or filter contact surfaces 920 and 964. One embodiment of system 900 includes a cold-water loop (with heat exchanger) running through the flat plates of the conditioner filter contact surfaces 920 and a hot-water loop running through the flat plates of the regenerator filter contact surfaces 964. As with the systems of FIGS. 1-4, these embodiments may include a conditioner cooler or heat exchanger (such as heat exchanger 39) and a regenerator heater or heaters (such as heaters 81, 184). In this regard, it will be clear to those in the art that the system 900 can readily be adapted as was the system 100 of FIG. 1 to include additional enhancements, including a capture filter(s) with or without a filter heater, additional heaters in the conditioner and/or regenerator portions, and similar pretreatment and/or ESP configurations.

While not shown, a sensor, such as an anthrax detector, a weapon-grade gas or aerosol detector, and the like, can be provided at the inlet to the conditioners of the systems in FIGS. 1-4 and 9 to detect various contaminants. For example, it may be useful to determine when weaponized contaminants are introduced into the systems and to operate in a different mode. For example, the systems may operate mainly for dehumidification when no attack or contaminants are sensed by the sensor, but when an attack is sensed a controller may initiate a "defense" operation mode. In the defense mode, additional heat may be added to more rapidly deactivate captured contaminants. Additionally, in this mode, the number of recirculations utilized by the system (or interior air and, in some cases, of liquid desiccant) may be increased to more rapidly capture contaminants by insuring that interior air is fully pumped through the liquid desiccant system which may require more rapid air change in the interior spaces and lead to more rapid deactivation of captured contaminants.

FIGS. 10-13 illustrate the results of testing performed to determine the combined effect of a liquid desiccant used to kill spores that are surrogates for anthrax spores. In FIG. 10, the graph 1000 illustrates the effect of increased temperatures of LiCl liquid desiccant on *Bacillus cereus* spore viability. Lines 1010, 1020, and 1030 are provided to represent liquid desiccant with 40 percent by weight concentrations of LiCl at increasing temperatures (as are utilized in systems of FIGS. 1-4 and 9) of 30° C., 45° C., and 60° C., respectively. As can be seen, the test represented by graph 1000 illustrates the relationship of temperature on deactivation time of the *Bacillus cereus* spores. As the temperature of the liquid desiccant approaches 60° C. the viability decreases significantly within the first few hours. Hence, liquid desiccants at higher temperatures are much more effective at reducing viability of the spores (as measured by decreased number of viable spores per milliliter). In contrast, lower temperature liquid desiccant (such as 30° C. liquid desiccant) requires longer deactivation times to deactivate the spores.

FIG. 11 provides another graph 1100 representing another test for the anthrax surrogate *Bacillus cereus* at varying liquid desiccant concentrations. The test represented by graph 1100 illustrates that at the same temperature (i.e., 60° C.) increasing the concentration of salt (i.e., LiCl) in the liquid desiccant significantly reduces the deactivation time required to deactivate the *Bacillus cereus* spores. The test was performed using *Bacillus cereus* spores in LiCl liquid desiccant maintained at 60° C. but of varying concentrations. The varying concentrations (as measured by weight) are represented by lines 1110, 1120, 1130, 1140, and 1150 and were 20 percent LiCl, 25 percent LiCl, 30 percent LiCl, 35 percent LiCl, and 40 percent LiCl, respectively. As shown, increasing the concentration of LiCl from 20 to 25 percent by weight significantly enhances the deactivation effectiveness (as measured by reduction in percentage of viable spores/deactivation time) and, similarly, increasing the concentration of LiCl from 25 to 30 percent provides another significant improvement in deactivation effectiveness. Further increases in concentration do not provide as significant of improvements (at least with the accuracy of the graph 1100) but do result in improvements. The test illustrated in FIG. 11 is useful for indicating the desirability of utilizing the highest concentration of LiCl in a liquid desiccant at a given temperature that is practical within a given ventilation system. For the tests shown in FIGS. 10 and 11, there is no significant reduction in the number of colony forming units (CFUs) under identical conditions in deionized water (as was observed and shown for the experiments of FIGS. 12 and 13).

Figure 12:
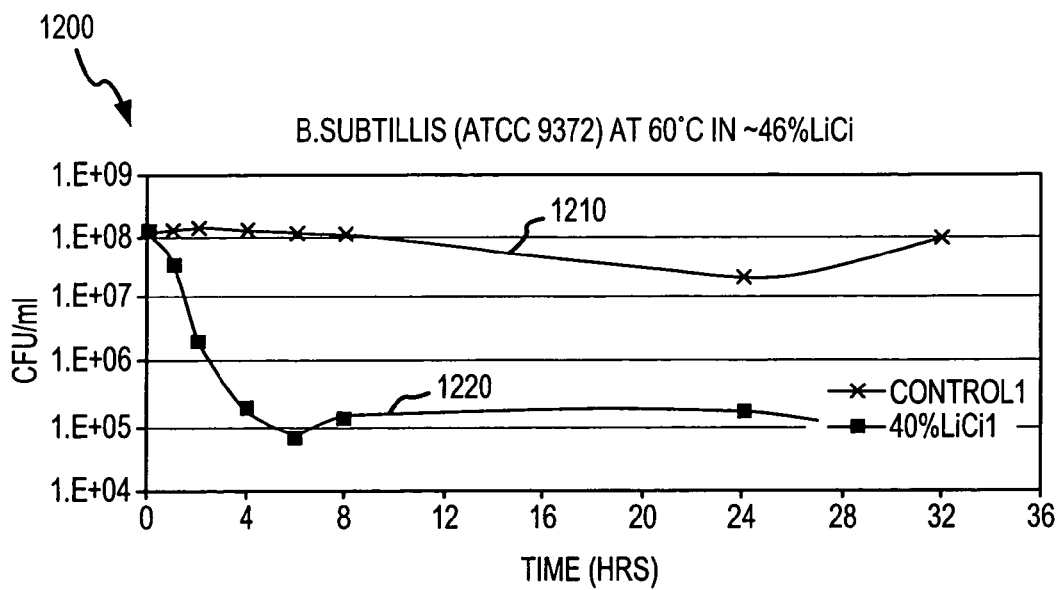

FIG. 12 provides a graph 1200 that compares the activity of *Bacillus subtilus* spores in deionized water (i.e., "control") and in liquid desiccant having approximately 40 percent LiCl concentration by weight. The test measured the colony forming units (CFU) per milliliter in two samples over a period of time. The control sample is illustrated by line 1210 and contained deionized water maintained at 60° C. for 32 hours into which a fixed amount of *Bacillus subtilis* spores were added. As shown, the effect of temperature alone over time did not result in a significant reduction in the activity of the spores. In contrast, the second sample shown by line 1220 shows a marked reduction in spore activity within the first several hours. This sample contained liquid desiccant having a concentration of LiCl of about 40 percent by weight that was maintained at 60° C. for a period of 32 hours. The test represented by graph 1200 illustrates that heat alone is not effective for deactivating surrogate spores of anthrax, but the combined effect of LiCl and heat does act to deactivate the spores.

Figure 13:
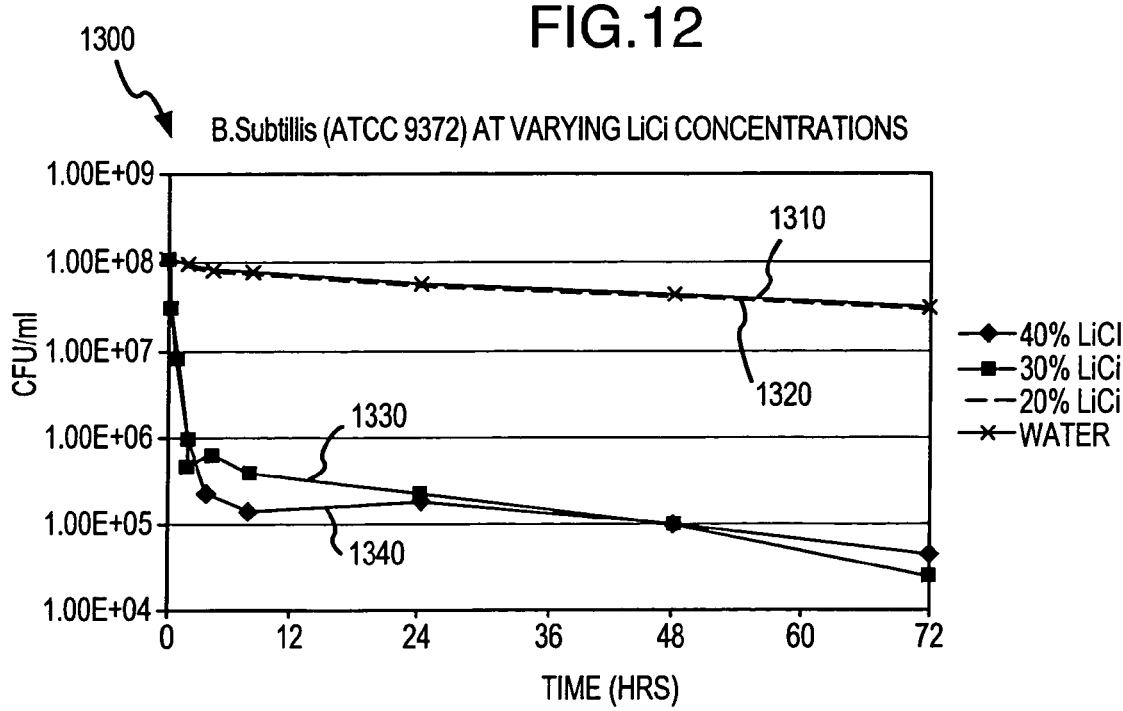

FIG. 13 illustrates a graph 1300 representing the results of a test similar to the one illustrated in FIG. 12 further showing the results of increasing the concentration levels of LiCl. In the test, each sample was maintained at approximately 60° C. for about 72 hours and the activity was measured by determining the CFUs existing per milliliter of sample. As shown, the deionized water and 20 percent concentration of LiCl, represented by lines 1310, 1320, provided almost identical results, i.e., only a small amount of deactivation that occurred very gradually over the testing or deactivation time period. In contrast, the samples having 30 and 40 percent concentrations of LiCl represented by lines 1330, 1340 produced results indicating that increased concentrations of LiCl in liquid desiccant when combined with heat result in rapid and significant deactivation of the *Bacillus subtilis* spores. As with the test of FIG. 11, this test indicates the desirability of utilizing a higher concentration of salt, such as LiCl, in the liquid desiccant used in the systems of FIGS. 1-4 and 9 to achieve more rapid and higher levels of deactivation of spore contaminants.

Figure 14:
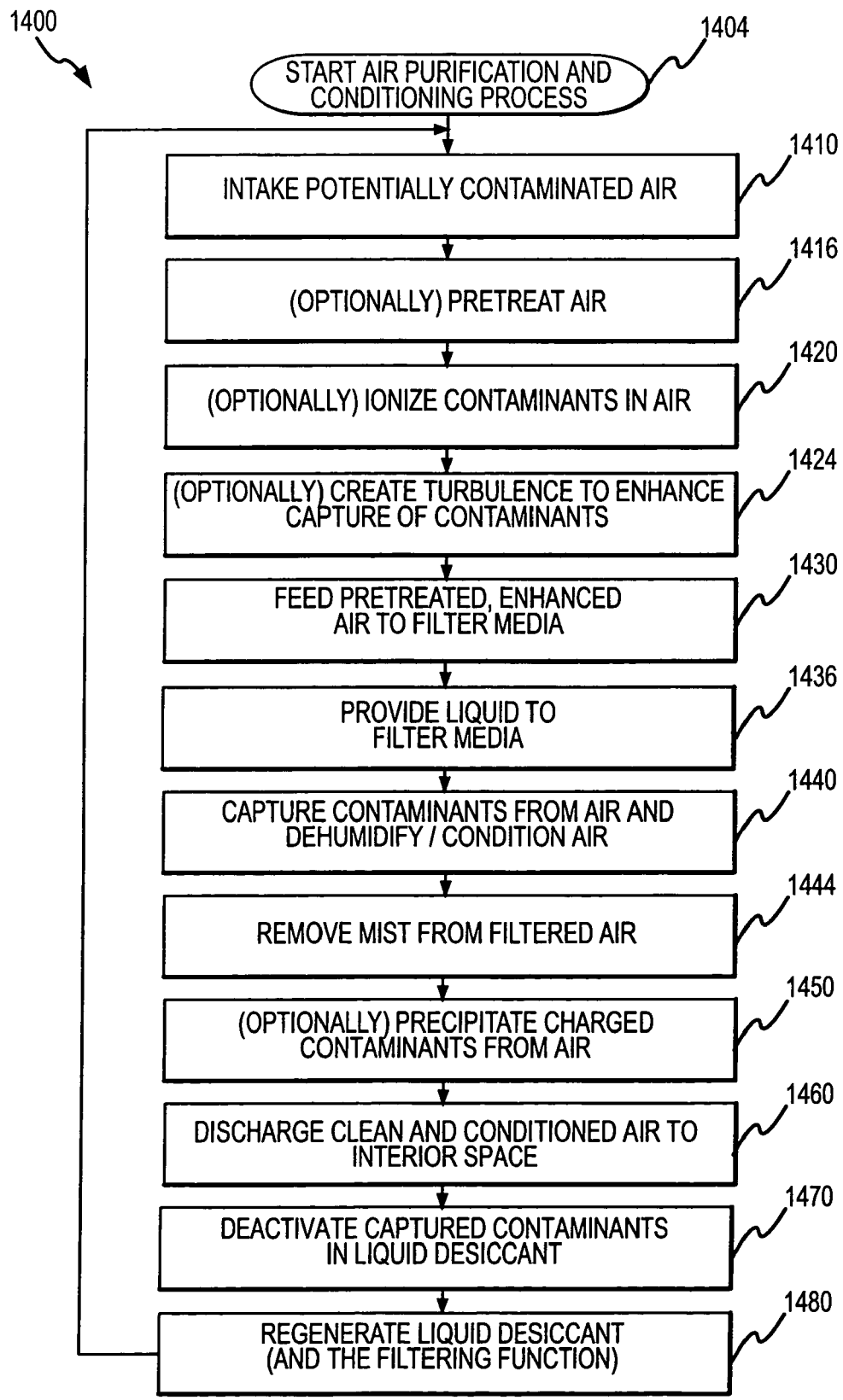
FIG. 14 is flow chart providing exemplary steps for the process of using a ventilation system with a liquid desiccant system as a regenerable filter for capturing and deactivating contaminants in an air stream.

While FIGS. 1-9 illustrate particular systems for purifying and conditioning potentially contaminated air, an important aspect of the invention is the use of liquid desiccant as a regenerable filter for capturing and deactivating a range of potentially harmful airborne contaminants independent of the particular system configuration. In this regard, FIG. 14 illustrates an exemplary process of using desiccant to filter air, to kill or deactivate captured contaminants, and to condition the air. In FIG. 14, exemplary steps of a purifying and conditioning process 1400 are illustrated that can be used in a variety of ventilation systems (including systems shown in FIGS. 1-4 and 9 and other arrangements not specifically described herein). The process starts at 1404 typically with the design and installation (or modification) of a ventilation system with one or more liquid desiccant dehumidification systems adapted for use as a regenerable filter for airborne contaminants.

At 1410, the process 1400 continues with taking in potentially contaminated air from outside an enclosed space (such as the exterior of a building or vehicle) and/or from the enclosed space itself (i.e., recirculated air that is directed to the liquid desiccant system for purification and further conditioning). At optional step 1416, the intake air may be treated to enhance later capture of the contaminants within the air stream such as by fogging, by introducing additives to the air stream that effect the size or physical or chemical characteristics of the contaminant particles, and/or by condensing. For example, fogging may be performed at 1416 to enhance later precipitation of particles using an electronic air filter. If the process includes utilizing electronically enhanced filtering, step 1420 is performed to ionize or chare the contaminants in the intake (and optionally pretreated) air. At 1424, it may be useful to include in the process a step for generating turbulence or otherwise disturbing (such as creating a pressure drop) the flow of the contaminated air to take advantage of inertial filtering. Step 1424 may be performed in numerous ways (including forcing air to flow through a pressure drop device or an insert for redirecting air (and liquid desiccant flow) in a manner that causes turbulence in the air at a point where the air is contacting liquid desiccant (such as the insert shown in FIGS. 5-8). Step 1424 may also be performed by forcing the air through a filter or filter packing media that is relatively tightly packed producing irregular flow paths and a large contact surface area between the air and the filter or packing media.

At 1430, the pretreated, "enhanced" air is directed through a filter packing media with a selected void space to provide a desired contact area. Concurrently with step 1430, step 1436 is performed to provide liquid desiccant at selected temperatures and flow rates to the filter packing media. The temperature of the desiccant is preferably selected to provide cooling/dehumidification. The flow rate is selected to provide effective wetting of all or substantial portions of the filter packing media (e.g., in most cases not all of the exterior packing surfaces are wetted) such that contact surfaces are covered with liquid desiccant. At 1440, contaminants are captured or filtered from the air and concurrently the air is dehumidified. The liquid desiccant passing through the filter packing media performs both of these processes by removing moisture from the air and concurrently filtering a substantial amount of the contaminants from the air as the air contacts the surfaces of the filter packing media and contacts flowing liquid desiccant. Such capture of contaminants is, in some cases, enhanced by the pretreatment of the air at 1416, by the creation of a turbulent or otherwise enhanced flow at 1424, and by the ionizing of the contaminants at 1420 which increases attraction of the contaminants by the desiccant.

At 1444, mist is removed from the filtered air, such as by passing the filtered air through a mist eliminator or other device. At 1450, if the contaminants have been ionized, the charged particles (that were not captured by the liquid desiccant) are precipitated out of the air such as by attraction to portions of an electrostatic precipitator (ESP), to portions of the filter packing media, and/or to the liquid desiccant itself. Alternatively, steps 1420 and 1450 can be combined by employing a single stage ESP. The process 1400 may further include a step of cleaning the electrically-attracted contaminants from the collection surfaces. At 1460, the purified and conditioned air is discharged to an interior space or to another ventilation system.

At 1470, the process 1400 continues with the deactivation of captured contaminants in the liquid desiccant. Note, the deactivation of step 1470 typically is an ongoing process that occurs concurrently with capturing of contaminants and is performed so the process 1400 does not require manual removal of a component having a concentration of hazardous contaminants. The deactivation of captured contaminants is an important feature of the invention that has been discussed in detail with reference to FIGS. 1-13 and that is further discussed below with particular reference to deactivating biological agents and chemical agents with liquid desiccant and heat. The process 1400 then includes the step 1480 of regenerating the liquid desiccant (such as with a regenerator portion of a liquid desiccant dehumidifying system such as that shown in FIGS. 1-4 and 9) to allow the liquid desiccant to be reused in steps 1436, 1440, and 1470 (i.e., to avoid frequent maintenance of a filter as was the case when using HEPA or other conventional filter devices).

With a general understanding of the use of liquid desiccant as a regenerable filter and of useful ventilation system arrangements, it may now be helpful to provide separate discussions of how and why liquid desiccant has proven effective for biological agents and for chemical agents. In general operations of systems according to the invention, the liquid desiccant solution ranges in salt concentration from 0 percent to as high as practical (such as in generally in the range of about 20 to 45 percent for most Halide salts and about 40 to 45 percent for LiCl, in particular, by weight). In some embodiments, there are lower concentrations of other additives (such as molybdate ion) that provide anticorrosion or other functions in the ventilation system and the balance of the liquid desiccant used is water. The vapor pressure of water is reduced by the high salt concentration, which provides the desiccant or conditioning function. In thermodynamic terms, the salt decreases the activity of water with pure water having an activity of 1 at 0° C. and water activity of LiCl solutions at 40° C. is about 0.5 for a 25 percent concentration and about 0.1 for a 45 percent concentration. Most bacteria will not grow below a water activity of about 0.9 (see, for example, http://web.utk.edu/~golden/Courses/FST521/notes/aw.htm). Bacterial spores have an estimated water activity of about 0.7 (see, for example, Marquis, R. E., et. al., *J. Bact. Symp. Suppl.*, 76 (1994) pp. 40S-48S).

The reduced water content of *Bacillus* spores (such as anthrax spores) is believed to be one of its protective mechanisms. The reduced water content contributes to the heat stability and is a contributor to the fact that dry heat is less effective than wet heat (saturated steam) in deactivating spores. More particularly, higher temperatures or longer deactivation times are typically required to kill spores under dry heat conditions (see, Brown, K. L., *J. Bact. Symp. Suppl.*, 76 (1994) pp. 67S-80S). Another feature of *Bacillus* spores that is believed to have a protective function is the high concentration of calcium. Spores are about 9 percent by weight calcium dipicolinate whereas cells contain none. Other forms of calcium also contribute to the calcium content of spores, such as *Bacillus* spores (see, Marquis, R. E., et. al., *J. Bact. Symp. Suppl.*, 76 (1994) pp. 40S-48S and Setlow, P., *J. Bact. Symp. Suppl.*, 76 (1994) pp. 49S-60S). The protection of the spore content is not due to a spore wall that is impermeable because, in fact, there is free movement of water and ions in and out of the spore so that the contents are in communication with the spore's environment.

During experimentation and design of the systems of FIGS. 1-4 and 9, it was found that the synergistic effect of salts, such as LiCl, and heat was unexpectedly useful for deactivating or killing spores. Prior to these efforts of the inventors, it might have been expected that the lower water activity of the liquid desiccant solution would result in further desiccation of the spores to make the water content in spores captured in liquid desiccant even lower than in normal spores. Since lowered water content is generally considered one of the protective mechanisms, the additional desiccation would have been expected to impart greater thermal resistance. As experimentation (such as that shown in FIGS. 10-13) has shown, the spores captured in liquid desiccant are not more thermally resistant, and the increase in deactivation effectiveness may be provided by the interaction of the salt, such as LiCl, in the liquid desiccant with the spore or spore content. Regardless of the specific cause of the increased *Bacillus* spore deactivation, the use of liquid desiccant and systems provides a decided advantage over applying only wet heat or dry heat at lower temperatures (i.e., such as less than 100° C. which is much lower than the higher temperatures often utilized to deactivate spores, such as those utilized in the food and medical industries of greater than 200° C.). Other kinds of microbial agents (such as viruses, vegetative forms of bacteria, fungal and yeast cells and spores, protozoa, and the like) are generally accepted to be easier to deactivate than *Bacillus* spores, and thus, it can reasonably be concluded that the deactivation functions described for the systems and methods of the invention associated with liquid desiccant would also be effective for deactivating these other microbial agents.

A number of modifications can be made to the systems of FIGS. 1-4 and 9 and method of FIG. 14 to improve the capture and/or deactivation of microbial agents. The following modifications or additional features are considered to be covered by the present invention. Altering the chemistry of the liquid desiccant is expected to enhance the killing of microbes including increasing the acidity, increasing the lithium ion activity, and adding metal ions that are detrimental to microbes, e.g., bacteria, fungi, viruses, protozoa, and spores. More particularly, in some embodiments, Lewis acids are added, such as aluminum (+3), zinc (+2) ion, iron (such as +2 or +3) ions, or others selected from the main, transition, or lanthanide groups in the Periodic Table, to provide specific beneficial effects on microbe deactivation. Changing the lithium ion activity may be particularly important if the synergistic effect of LiCl and heat is due to the replacement of calcium by lithium ions in the spore driven by a chemical equilibrium effect. The goal of the inventive process and systems implementing the process need not be physical destruction of the spores but instead it may be sufficient to render the spore systems that trigger germination of the spore inactive. It is also possible to destroy spores by creating conditions in the liquid desiccant systems that initiate the irreversible chain of events that lead to germination of the spore while it is in the desiccant medium, which would remove the protection features of the spore and result in death of the germinating cell.

Chemistry altering agents can include, but are not limited to, positively charged metal ions such as those of magnesium, aluminum, boron, the first row transition metals, and the lanthanides. The oxidation state of the metal ions can be any state that is possible for a particular metal and stable in the desiccant medium. The metal ions may be added to the liquid desiccant as chloride salts in order to minimize the effect on the desiccant medium. Negatively charged ions such as sulfate, phosphate, pyrophosphate, or others can also have an effect on the surface properties of microbes. Certain organic compounds that exist as salts or are in polar form that renders them soluble in the desiccant may also be useful as an additive to the liquid desiccant to enhance contaminant deactivation.

The nature of the microbes themselves, either in their natural state or altered (e.g., weaponized) state to make them more lethal or more easily disseminated, may be exploited according to the invention to increase the capture in the ventilation system and purification processes, to concentrate the microbes at certain locations in the system to focus lethal treatments, and/or to facilitate removal of viable or deactivated forms during maintenance. These modifications of the illustrated systems include incorporation of surfaces designed to selectively bind the microbial agents using hydrophobic forces or other characteristics of the microbes. These surfaces can be in the form of specially textured surfaces, hydrophobic surfaces such as polymers (e.g., polypropylene and the like), and/or a filter placed in a recirculation line.

In order to enhance the capture of particulates, aerosols, and chemical vapors and also to increase the rate of deactivation of chemical and biological agents, the liquid desiccant can be modified by the addition of other substances, such as a wide range of metal ions that can be added while not degrading the desiccant function. The additives can be selected to affect the surface properties of bioaerosols (such as in a pretreatment device) to increase the dispersion in the liquid desiccant filter packing media. If contaminants are homogenously dispersed throughout the total hold-up volume of a desiccant tower (or wicked filter containing device) the probability of reemission in droplets that are carried out in the air stream exiting the conditioner is very low by virtue of the ratio of total volume of particles to the hold-up volume. In the case where spores or other aerosols are not absorbed into the liquid desiccant but are carried on the surface of the liquid or contained in the liquid as agglomerates, these spores can be adsorbed on the surface of structures included in the conditioner such as filter plates, screens, or porous media to which the spores or aerosols selectively adhere. In this case, the captured agents can be deactivated in place by the liquid desiccant and/or its additives or removed with the media during maintenance for treatment outside the system. The additives can be selected to enhance deactivation of biological and chemical agents by interfering with critical functions in the microbial structure (for example, with the site that triggers germination of spores). The additives may also be selected for their ability to interfere with the mechanisms that impart thermal stability to spores. Additionally, the additives can be selected for their ability to act to catalyze chemical reactions of chemical agents that result in reduction in toxicity (for example, by catalyzing the rate of hydrolysis, i.e., reaction with water, of reactive bonds in the chemical agent).

Turning more specifically to the capture and deactivation of chemical agents, the characteristics of the system and processes of the invention that improve capture of water vapor, small particles, and aerosols also cause the liquid desiccant systems and processes to be effective in removal of chemical agents, such as nerve agents or blister agents. Nerve agents are organophosphorus compounds similar to many pesticides and are typically dispersed as aerosols. Blister agents are organosulfur compounds with reactive carbon-chlorine bonds that also have low vapor pressures and are dispersed as aerosols. There is also concern about the potential use of hazardous industrial chemicals by terrorists, which includes a very wide range of substances some of which will be amenable to capture and neutralization by liquid desiccant systems of the invention. The capture and deactivation features described for chemical warfare agents are applicable to many other forms of hazardous chemicals or contaminants.

Destruction of stockpiles of chemical agents by hydrolysis (i.e., reaction with water), oxidation, or a combination of both has been described (see, for example, Yang, Y. C., *Acc. Chem. Res.*, 32 (1999) pp. 109-115 and Yang, Y. C., et al., *Chem. Rev.*, 92 (1999) pp. 1729-1743). Nerve agents have phosphorus bonds to sulfur, nitrogen, oxygen, or fluorine that can be replaced by hydroxyl groups by reaction with water under acidic or basic conditions (e.g., hydrolysis). The reaction can also be catalyzed by Lewis acids or basic catalysts. The sulfur mustard agents have reactive carbon-chlorine bonds that can also be hydrolyzed and the sulfur site can be oxidized. Mixtures formulated to clean contaminated surfaces or conditions designed for the destruction of chemical agents are described in the above-referenced review articles.

The liquid desiccant systems and processes of the invention are based on very concentrated solutions of salts (such as LiCl) in water, and this presents a different approach to the capture of hazardous gases or aerosols and to the deactivation of the captured contaminants in the liquid desiccant. Capture by and absorption of the chemical agents into the liquid desiccant medium is a precursor to the deactivation of the agents. The modifications of the liquid desiccant medium that enhance its chemical reactivity described above with relation to biological agents can also increase the capture efficiency and solubility of the chemical agents in the liquid desiccant.

In some embodiments of the invention, the hydrolysis reactions are catalyzed by the high concentration of lithium ion or by added metal ions (such as those discussed previously). Ions of metals, for example but not limited to aluminum, boron, iron, copper, and lanthanide metals, can have a strong catalytic effect on hydrolysis reactions. These ions can be added to the liquid desiccant as chloride salts. Catalysis by substances dissolved in the liquid desiccant where the chemical reactions are occurring can be termed "homogeneous catalysis." Hydrolysis reactions are also sometimes catalyzed in the processes and systems of the invention by acidic or basic surfaces. This is termed "heterogeneous catalysis" since the catalyst is a solid in contact with the liquid phase. Representative heterogeneous catalysts include metal oxides such as alumina or titania, zeolites, and activated carbon. These kinds of materials are characterized by high surface area, are acidic or basic in nature, and provide enhanced interaction of surfaces of the system with the compounds or contaminants considered targets for deactivation. The heterogeneous catalyst is normally supported (e.g., bound to) a non-reactive structure such as a honeycomb or textured surface or to packing materials (such as in the filter packing media or wicking filter of the systems in FIGS. 1-4 and 9) such as saddles, extruded shapes, polymer packing materials, and the like. These filter or packing media increase the efficiency of contact between the liquid and solid phases (e.g., between the liquid desiccant and the contaminants).

The chemical reaction rates increase with increasing temperatures of the liquid desiccant. It is therefore advantageous in the case of heterogeneous catalysts to deploy the catalytic structures in parts of the systems of the invention where the temperature is greatest, such as near the heaters and heat exchangers that heat the fluid for regeneration and/or in the heated capture filters. The homogeneous catalysts are dispersed throughout the system and locations of the liquid medium so that reaction takes place at rates that vary with the temperature of the liquid desiccant in different parts of the described systems. Heterogeneous and homogeneous catalysts have certain advantages for use in the ventilation systems of the invention. Heterogeneous catalysts are localized, they do not modify the bulk liquid medium, and the nature of the heterogeneous catalyst does not present a materials compatibility problem. Homogeneous catalysts being dispersed throughout the liquid medium can function everywhere in the system (at varying rates) and eliminate mass transfer limitations on deactivation rates. The choice of metal ions, for example, may be limited in the systems by potential for corrosive reactions with some surfaces that the liquid desiccant contacts, e.g., metal heat exchanger surfaces. However, most of the liquid desiccant portion of the described ventilation systems, with exception of portions of the heaters and/or heat exchangers, is preferably constructed of polymeric materials that are resistant to corrosion. Deactivation of chemical agents results in the formation of some chemical residues in the system that are harmless or that only present a low level of chemical hazard, which may require that there be some maintenance procedures over the life of a system constructed and operated according to the invention to remove any significant collection or deposit of such residue.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the specific materials described above can be varied significantly to practice the invention as will be readily appreciated by those skilled in the art. The systems shown in FIGS. 1-4 and 9 may be utilized within or as part of a wide variety of HVAC configurations to provide the dual purposes of conditioning and purification (i.e., capture and deactivation of contaminants) of air (or, more accurately, any gas) stream. For example, the air intakes of these systems may be configured to purify the indoor or recirculated air of a building. More specifically, the systems and methods of the invention may be used to condition and purify air in spaces that are more prone to contaminants or to an attack (i.e., high risk spaces). For these high risk spaces (e.g., mailrooms, lobbies, and the like), the systems may be operated for multiple air passes to more quickly and effectively remove contaminants that may be in the air or such a multiple-pass operating mode may be instigated in response to a sensor detecting the presence of a contaminant within the high risk space.

Further, the teachings of the systems of FIGS. 1-4 and 9 and the method of Claim 1 can readily be applied to applications that do not require heat to be added to obtain acceptable deactivation of certain contaminants, and these non-heated embodiments are believed to be within the breadth of the above disclosure and following claims. For example, a non-heated application may utilize ventilation air enthalpy exchange, which typically utilizes $CaCl_2$ in the liquid desiccant because of its lower cost. In this embodiment, the liquid desiccant is regenerated by exposure to building exhaust air. Accelerated deactivation or kill may not occur in this embodiment due to the lower temperatures, but inactivation does occur over longer periods of time (such as days or weeks) due to the permanent residence time for the contaminant in the liquid desiccant.

A non-heated system would have a configuration similar to that shown in FIGS. 1-4 and 9 except the system would most likely not include an interchange heat exchanger 60 or a desiccant cooling heat exchanger 39. The primary difference would be found in the airflows and in the liquid desiccant temperatures. Outside air would be taken into the conditioner portion (as is typically seen in FIGS. 1-4 and 9) but building exhaust air would be taken into the regenerator portion instead of outside air. The liquid desiccant temperatures would vary with outdoor conditions such as a summer range of 15 to 30° C. and a winter range of −5 to 15° C. The conditioner would pre-cool/dehumidify in the summer (and pre-heat/humidify in the winter) the outdoor air while removing contaminants. The liquid desiccant would then be pumped from the conditioner sump to the top of the regenerator media for regeneration via contact with the building exhaust air. In a parallel plate geometry such as in the system 900 of FIG. 9, a closed-loop water line would be used to circulate water between the regenerator and the conditioner plates.

The foregoing discussion is intended to illustrate concepts by way of example with emphasis upon the preferred embodiments and instrumentalities. Accordingly, the disclosed embodiments and instrumentalities are not exhaustive of all options or mannerisms for practicing the disclosed principles hereof. The inventors hereby state their intention to rely upon the Doctrine of Equivalents in protecting the full scope and spirit of the invention.

The invention claimed is:

1. A method of purifying and conditioning a stream of air containing contaminants, comprising:
    wetting a filter packing media with a liquid desiccant comprising a concentration of a salt;
    directing the stream of air to flow through the wetted filter packing media;
    concurrently with the directing, capturing a fraction of the contaminants in the stream of air in the liquid desiccant;
    concurrently with the capturing, dehumidifying the stream of air with the liquid desiccant in the filter packing media;
    deactivating at least a portion the captured contaminants including heating at least a portion of the liquid desiccant with the captured contaminants to a deactivation temperature, wherein the deactivating includes after the capturing, collecting the liquid desiccant with the captured contaminants, pumping the collected liquid desiccant to a capture filter, and heating the filter to the deactivation temperature;
    regenerating the liquid desiccant including applying a quantity of heat and removing moisture from the liquid desiccant; and
    repeating the wetting with the regenerated liquid desiccant.

2. The method of claim 1, wherein the deactivating includes after the capturing, collecting the liquid desiccant with the captured contaminants and pumping the collected liquid desiccant through an interchange heat exchanger wherein heat from the regenerated liquid desiccant is transferred to the collected liquid desiccant.

3. The method of claim 2, wherein the deactivating further includes pumping a portion of the collected liquid desiccant that has been heated by the regenerated liquid desiccant to a slipstream heater and applying heat to the portion of the collected liquid desiccant to a regeneration deactivation temperature less than about 100° C.

4. The method of claim 1, further including ionizing the contaminants in the stream of air and electrostatically precipitating the ionized contaminants from the stream of air.

5. The method of claim 4, wherein the ionizing is performed prior to the directing and the precipitating is performed after the directing.

6. The method of claim 1, further including creating turbulence in the stream of air prior to the capturing to enhance inertial filtering during the capturing.

7. The method of claim 6, wherein the turbulence creating is performed concurrently with the directing.

8. The method of claim 1, further including treating the stream of air prior to the directing, wherein the treating is selected from the group of treatments consisting of fogging the stream of air, applying additives to the contaminants, and condensing the stream of air.

9. The method of claim 1, wherein the concentration is between about 40 and 45 percent by weight.

10. The method of claim 1, wherein the salt is selected from the group consisting of LiCl, $CaCl_2$, and LiBr.

11. The method of claim 1, wherein the deactivation temperature is in the range of 10 to 120° C.

12. The method of claim 1, wherein the liquid desiccant further includes metal ion additives.

13. The method of claim 1, wherein the captured contaminants include anthrax spores.

14. The method of claim 1, wherein the captured contaminants are contaminants selected from the group of contaminants consisting of allergens, pathogens, anthrax spores, nerve agents, mustard gas, phosgene, cyanogen chloride, chorine, salmonella bacteria, E. coli bacteria, and small pox virus.

15. An apparatus for conditioning air and for capturing and deactivating biological and chemical contaminants in the air, comprising:
a filter with a plurality of contact surfaces;
an electronic air filter with surfaces adapted for charging the contaminants and collection surfaces electrically enhanced for attracting the charged contaminants;
an air intake in communication with the filter gathering the air and directing the air to the filter;
a distribution manifold distributing a liquid desiccant with a concentration of salt to the filter at a flow rate to wet the contact surfaces with the liquid desiccant;
a conditioner sump for collecting the liquid desiccant that has passed through the filter and that has captured at least a portion of the contaminants from the air;
a recirculation pump connected to the conditioner sump for pumping the liquid desiccant with the captured contaminants to the distribution manifold; and
a regenerator linked to the conditioner sump for withdrawing diluted portions of the liquid desiccant from the sump and for returning the withdrawn liquid desiccant in a regenerated form, wherein the regenerator includes a heater for applying heat to the liquid desiccant and a regenerative filter for removing moisture from the heated liquid desiccant.

16. The apparatus of claim 15, wherein the captured contaminants include anthrax spores.

17. The apparatus of claim 15, wherein the captured contaminants are contaminants selected from the group consisting of bioaersols, respirable particles, vapors and gases, chemical agents, and biological agents.

18. The apparatus of claim 15, further including a pair of capture filters upstream of the distribution manifold, a valve for selectively directing flow away from one of the capture filters, and a filter heater contacting the capture filters for applying heat to the one capture filter to raise the temperature of the liquid desiccant in the one capture filter to a deactivation temperature selected for deactivating the captured contaminants.

19. The apparatus of claim 15, wherein the filter comprises a wicking filter or comprises structured packing.

20. The apparatus of claim 15, wherein the regenerator further includes a slipstream heater in parallel to the regenerator heater and a valve for directing a portion of the withdrawn liquid desiccant to the slipstream heater, the slipstream heater heating to at least partially deactivate the contaminants in the directed portion.

21. The apparatus of claim 15, the regenerator further including a sump for collecting the regenerated form of the withdrawn liquid desiccant, wherein during operation of the apparatus the flow rate of liquid desiccant at the distribution manifold is in the range of 10 and 20 gallons per minute, flow of the heated liquid desiccant in the regenerator is in the range of 5 and 15 gallons per minute, and interchange flow of the liquid desiccant between the conditioner sump and the regenerator sump is less than 5 gallons per minute.

22. The apparatus of claim 21, wherein during operation of the apparatus the temperature of the liquid desiccant in the distribution manifold is in the range of about 10 to 30° C., in the conditioner sump is in the range of about 30 to 40° C. downstream of the regenerator heater is in the range of about 40 to 100° C., and in the regenerator sump is in the range of about 40 to 75° C.

23. The apparatus of claim 15, further including an inertial filtration enhancement insert positioned in contact with the filter adapted to create turbulent flow in the air in the filter adjacent sidewalls of the insert and to direct the liquid desiccant to contact the turbulently flowing air.

24. The apparatus of claim 15, further including a pretreatment device positioned downstream of the air intake and configured to pretreat the gathered air prior to directing the air to the filter with a treatment selected from the group of treatments consisting of fogging the gathered air, applying additives to the contaminants in the gathered air, and condensing the gathered air.

25. A ventilation system for purifying and dehumidifying air having one or more contaminants, comprising:
a volume of liquid desiccant comprising water and a concentration of a salt;
a conditioner including: an air intake for directing the air into the conditioner;
a filter media comprising corrosion-resistant packing arranged with a void fraction creating a plurality of flow paths for the liquid desiccant and the air defined by contact surfaces;
a conditioner sump below the filter media for collecting the liquid desiccant; and a recirculation pump for pumping the liquid desiccant from the conditioner sump to a distribution device above the filter media at a flow rate selected to be large enough to substantially wet the contact surfaces with the liquid desiccant, wherein the liquid desiccant captures a portion of the contaminants from the air;
a capture filter between the conditioner sump and the filter media and a filter heater for heating the liquid desiccant within the capture filter to a deactivation temperature; and
a regenerator in fluid communication with the conditioner to receive a dilute portion of the liquid desiccant from the conditioner sump and to return regenerated liquid desiccant to the conditioner sump, wherein the regenerator includes a regenerator heater for heating the diluted portion to a regeneration temperature and a filter for removing moisture from the heated portion to generate the regenerated liquid desiccant;
wherein the captured contaminants in the liquid desiccant are at least partially deactivated.

26. The system of claim 25, wherein the concentration of the salt is less than about 60 percent by weight.

27. The system of claim 26, wherein the salt is a Halide salt.

28. The system of claim 25, wherein the flow rate is in the range of about 10 to about 20 gallons per minute.

29. The system of claim 25, wherein the deactivation temperature is less than 100° C. and the capture filter has a rating of less than about 0.5 microns.

30. The system of claim 25, wherein the regenerator further includes a slipstream heater in parallel to the regenerator heater for heating at least a fraction of the diluted portion to a temperature greater than the heated portion exiting the regenerative heater, whereby at least a portion of the contaminants are deactivated.

31. The system of claim 25, wherein the conditioner includes a charger upstream of the filter media for ionizing the contaminants in the air and a set of collection surfaces electronically enhanced to attract and collect the ionized contaminants.

32. The system of claim 25, further including a heat exchanger positioned between the conditioner and the regenerator configured to receive the regenerated liquid desiccant and the dilute portion of the liquid desiccant and to enable heat to be transferred from the regenerated liquid desiccant to the dilute portion.

33. The system of claim 25, wherein the at least partially deactivated contaminants include weaponized chemical or biological agents.

34. The system of claim 33, wherein the agents are selected from the group of agents consisting of anthrax spores, nerve agents, mustard gas, phosgene, cyanogen chloride, chlorine, bacteria, and viruses.

35. A method of purifying and conditioning a stream of air containing contaminants, comprising:
wetting a filter packing media with a liquid desiccant comprising a concentration of a salt;
directing the stream of air to flow through the wetted filter packing media;
ionizing the contaminants in the stream of air and electrostatically precipitating the ionized contaminants from the stream of air;
concurrently with the directing, capturing a fraction of the contaminants in the stream of air in the liquid desiccant;
concurrently with the capturing, dehumidifying the stream of air with the liquid desiccant in the filter packing media;
deactivating at least a portion the captured contaminants including heating at least a portion of the liquid desiccant with the captured contaminants to a deactivation temperature;
regenerating the liquid desiccant including applying a quantity of heat and removing moisture from the liquid desiccant; and
repeating the wetting with the regenerated liquid desiccant.

36. A method of purifying and conditioning a stream of air containing contaminants, comprising:
wetting a filter packing media with a liquid desiccant comprising a concentration of a salt;
directing the stream of air to flow through the wetted filter packing media;
concurrently with the directing, capturing a fraction of the contaminants in the stream of air in the liquid desiccant;
concurrently with the capturing, dehumidifying the stream of air with the liquid desiccant in the filter packing media;
deactivating at least a portion the captured contaminants including heating at least a portion of the liquid desiccant with the captured contaminants to a deactivation temperature;
regenerating the liquid desiccant including applying a quantity of heat and removing moisture from the liquid desiccant; and
repeating the wetting with the regenerated liquid desiccant, wherein the captured contaminants include anthrax spores.

37. An apparatus for conditioning air and for capturing and deactivating biological and chemical contaminants in the air, comprising:
a filter with a plurality of contact surfaces;
an air intake in communication with the filter gathering the air and directing the air to the filter;
a distribution manifold distributing a liquid desiccant with a concentration of salt to the filter at a flow rate to wet the contact surfaces with the liquid desiccant;
a pair of capture filters upstream of the distribution manifold, a valve for selectively directing flow away from one of the capture filters, and a filter heater contacting the capture filters for applying heat to the one capture filter to raise the temperature of the liquid desiccant in the one capture filter to a deactivation temperature selected for deactivating the captured contaminants;
a conditioner sump for collecting the liquid desiccant that has passed through the filter and that has captured at least a portion of the contaminants from the air;
a recirculation pump connected to the conditioner sump for pumping the liquid desiccant with the captured contaminants to the distribution manifold; and
a regenerator linked to the conditioner sump for withdrawing diluted portions of the liquid desiccant from the sump and for returning the withdrawn liquid desiccant in a regenerated form, wherein the regenerator includes a heater for applying heat to the liquid desiccant and a regenerative filter for removing moisture from the heated liquid desiccant.

38. An apparatus for conditioning air and for capturing and deactivating biological and chemical contaminants in the air, comprising:
a filter with a plurality of contact surfaces;
an air intake in communication with the filter gathering the air and directing the air to the filter;
a distribution manifold distributing a liquid desiccant with a concentration of salt to the filter at a flow rate to wet the contact surfaces with the liquid desiccant;
a conditioner sump for collecting the liquid desiccant that has passed through the filter and that has captured at least a portion of the contaminants from the air;
a recirculation pump connected to the conditioner sump for pumping the liquid desiccant with the captured contaminants to the distribution manifold; and
a regenerator linked to the conditioner sump for withdrawing diluted portions of the liquid desiccant from the sump and for returning the withdrawn liquid desiccant in a regenerated form, wherein the regenerator includes a heater for applying heat to the liquid desiccant and a regenerative filter for removing moisture from the heated liquid desiccant, and wherein the regenerator further includes a slipstream heater in parallel to the regenerator heater and a valve for directing a portion of the withdrawn liquid desiccant to the slipstream heater, the slipstream heater heating to at least partially deactivate the contaminants in the directed portion.

39. An apparatus for conditioning air and for capturing and deactivating biological and chemical contaminants in the air, comprising:
   a filter with a plurality of contact surfaces;
   an inertial filtration enhancement insert positioned in contact with the filter adapted to create turbulent flow in the air in the filter adjacent sidewalls of the insert and to direct the liquid desiccant to contact the turbulently flowing air;
   an air intake in communication with the filter gathering the air and directing the air to the filter;
   a distribution manifold distributing a liquid desiccant with a concentration of salt to the filter at a flow rate to wet the contact surfaces with the liquid desiccant;
   a conditioner sump for collecting the liquid desiccant that has passed through the filter and that has captured at least a portion of the contaminants from the air;
   a recirculation pump connected to the conditioner sump for pumping the liquid desiccant with the captured contaminants to the distribution manifold; and
   a regenerator linked to the conditioner sump for withdrawing diluted portions of the liquid desiccant from the sump and for returning the withdrawn liquid desiccant in a regenerated form, wherein the regenerator includes a heater for applying heat to the liquid desiccant and a regenerative filter for removing moisture from the heated liquid desiccant.

40. An apparatus for conditioning air and for capturing and deactivating biological and chemical contaminants in the air, comprising:
   a filter with a plurality of contact surfaces;
   an air intake in communication with the filter gathering the air and directing the air to the filter;
   a pretreatment device positioned downstream of the air intake and configured to pretreat the gathered air prior to directing the air to the filter with a treatment selected from the group of treatments consisting of fogging the gathered air, applying additives to the contaminants in the gathered air, and condensing the gathered air;
   a distribution manifold distributing a liquid desiccant with a concentration of salt to the filter at a flow rate to wet the contact surfaces with the liquid desiccant;
   a conditioner sump for collecting the liquid desiccant that has passed through the filter and that has captured at least a portion of the contaminants from the air;
   a recirculation pump connected to the conditioner sump for pumping the liquid desiccant with the captured contaminants to the distribution manifold; and
   a regenerator linked to the conditioner sump for withdrawing diluted portions of the liquid desiccant from the sump and for returning the withdrawn liquid desiccant in a regenerated form, wherein the regenerator includes a heater for applying heat to the liquid desiccant and a regenerative filter for removing moisture from the heated liquid desiccant.

41. A ventilation system for purifying and dehumidifying air having one or more contaminants, comprising:
   a volume of liquid desiccant comprising water and a concentration of a salt;
   a conditioner including: an air intake for directing the air into the conditioner;
   a filter media comprising corrosion-resistant packing arranged with a void fraction creating a plurality of flow paths for the liquid desiccant and the air defined by contact surfaces;
   a conditioner sump below the filter media for collecting the liquid desiccant; and a recirculation pump for pumping the liquid desiccant from the conditioner sump to a distribution device above the filter media at a flow rate selected to be large enough to substantially wet the contact surfaces with the liquid desiccant, wherein the liquid desiccant captures a portion of the contaminants from the air; and
   a regenerator in fluid communication with the conditioner to receive a dilute portion of the liquid desiccant from the conditioner sump and to return regenerated liquid desiccant to the conditioner sump, wherein the regenerator includes a regenerator heater for heating the diluted portion to a regeneration temperature and a filter for removing moisture from the heated portion to generate the regenerated liquid desiccant, wherein the regenerator further includes a slipstream heater in parallel to the regenerator heater for heating at least a fraction of the diluted portion to a temperature greater than the heated portion exiting the regenerative heater, whereby at least a portion of the contaminants are deactivated;
   wherein the captured contaminants in the liquid desiccant are at least partially deactivated.

42. A ventilation system for purifying and dehumidifying air having one or more contaminants, comprising:
   a volume of liquid desiccant comprising water and a concentration of a salt;
   a conditioner including: an air intake for directing the air into the conditioner;
   a filter media comprising corrosion-resistant packing arranged with a void fraction creating a plurality of flow paths for the liquid desiccant and the air defined by contact surfaces;
   a conditioner sump below the filter media for collecting the liquid desiccant; and a recirculation pump for pumping the liquid desiccant from the conditioner sump to a distribution device above the filter media at a flow rate selected to be large enough to substantially wet the contact surfaces with the liquid desiccant, wherein the liquid desiccant captures a portion of the contaminants from the air, wherein the conditioner includes a charger upstream of the filter media for ionizing the contaminants in the air and a set of collection surfaces electronically enhanced to attract and collect the ionized contaminants; and
   a regenerator in fluid communication with the conditioner to receive a dilute portion of the liquid desiccant from the conditioner sump and to return regenerated liquid desiccant to the conditioner sump, wherein the regenerator includes a regenerator heater for heating the diluted portion to a regeneration temperature and a filter for removing moisture from the heated portion to generate the regenerated liquid desiccant;
   wherein the captured contaminants in the liquid desiccant are at least partially deactivated.

* * * * *